US008857962B2

(12) United States Patent
Goto et al.

(10) Patent No.: US 8,857,962 B2
(45) Date of Patent: Oct. 14, 2014

(54) IMAGE FORMING METHOD AND IMAGE FORMED RECORD

(75) Inventors: Hiroshi Goto, Kanagawa (JP); Hisashi Habashi, Kanagawa (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 261 days.

(21) Appl. No.: 12/863,542

(22) PCT Filed: Jan. 16, 2009

(86) PCT No.: PCT/JP2009/051020
§ 371 (c)(1),
(2), (4) Date: Jul. 19, 2010

(87) PCT Pub. No.: WO2009/091079
PCT Pub. Date: Jul. 23, 2009

(65) Prior Publication Data
US 2010/0295891 A1    Nov. 25, 2010

(30) Foreign Application Priority Data

Jan. 17, 2008 (JP) ................................ 2008-008023

(51) Int. Cl.
*B41J 2/01* (2006.01)
*B41M 5/00* (2006.01)
*C09D 11/54* (2014.01)
*C09D 11/00* (2014.01)
*B41J 2/21* (2006.01)
*C09D 11/322* (2014.01)
*B41J 11/00* (2006.01)

(52) U.S. Cl.
CPC ............ *B41M 5/0017* (2013.01); *C09D 11/54* (2013.01); *B41M 5/0035* (2013.01); *B41M 5/0011* (2013.01); *B41J 11/0015* (2013.01); *C09D 11/005* (2013.01); *B41J 2/2107* (2013.01); *C09D 11/322* (2013.01)
USPC ................................ 347/100; 347/96; 347/98

(58) Field of Classification Search
CPC .......... B41J 2/21; B41J 2/2107; B41J 2/2114; B41J 11/0015; C09D 11/54
USPC ............ 347/9, 21, 95–100, 28; 523/160, 161; 106/31.13, 31.6
See application file for complete search history.

(56) References Cited

U.S. PATENT DOCUMENTS 5,928,419 A * 7/1999 Uemura et al. ............... 106/493
6,786,588 B2 * 9/2004 Koyano et al. ................ 347/100

(Continued)

FOREIGN PATENT DOCUMENTS

CN        1916090 A     2/2007
EP     1 132 438 A2     9/2001

(Continued)

OTHER PUBLICATIONS

U.S. Appl. No. 11/623,928, filed Jan. 17, 2007, Aruga, et al.

(Continued)

*Primary Examiner* — Matthew Luu
*Assistant Examiner* — Rut Patel
(74) *Attorney, Agent, or Firm* — Oblon, Spivak, McClelland, Maier & Neustadt, L.L.P.

(57) ABSTRACT

An image forming method of the present invention including applying a pretreatment liquid to a recording medium, and discharging an inkjet recording ink dropwise according to an image signal to form an image on the recording medium on which the pretreatment liquid has been applied, wherein the recording medium is regular paper which has no coat layer, the pretreatment liquid contains a cationic polymer compound, a surfactant A, water and a water-soluble organic acid, and the inkjet recording ink contains a water-dispersible colorant, a water-soluble organic solvent, a surfactant B, a penetrating agent and water, and wherein the pretreatment liquid has a static surface tension of 20 mN/m to 30 mN/m.

11 Claims, 1 Drawing Sheet

(56) References Cited

U.S. PATENT DOCUMENTS

| | | | |
|---|---|---|---|
| 8,044,114 B2 * | 10/2011 | Habashi et al. | 523/160 |
| 2001/0033318 A1 | 10/2001 | Koitabashi et al. | |
| 2004/0231556 A1 * | 11/2004 | Shimomura et al. | 106/31.43 |
| 2004/0252169 A1 | 12/2004 | Chen et al. | |
| 2005/0264630 A1 | 12/2005 | Doi | |
| 2006/0055755 A1 | 3/2006 | Yui | |
| 2006/0203055 A1 * | 9/2006 | Doi | 347/96 |
| 2007/0037901 A1 | 2/2007 | Kanaya et al. | |
| 2007/0054981 A1 * | 3/2007 | Yanagi et al. | 523/160 |
| 2007/0197685 A1 | 8/2007 | Aruga et al. | |
| 2007/0221078 A1 * | 9/2007 | Namba et al. | 101/327 |
| 2008/0055385 A1 * | 3/2008 | Houjou | 347/213 |
| 2008/0233363 A1 | 9/2008 | Goto et al. | |
| 2009/0176070 A1 | 7/2009 | Goto et al. | |

FOREIGN PATENT DOCUMENTS

| | | |
|---|---|---|
| EP | 1 132 438 A3 | 9/2001 |
| EP | 1 243 435 A1 | 9/2002 |
| EP | 1 486 541 A1 | 12/2004 |
| JP | 4 259590 | 9/1992 |
| JP | 6 92010 | 4/1994 |
| JP | 2667401 | 6/1997 |
| JP | 2675001 | 7/1997 |
| JP | 2711098 | 10/1997 |
| JP | 11 228890 | 8/1999 |
| JP | 2000-53900 | 2/2000 |
| JP | 2001 171095 | 6/2001 |
| JP | 2001 199149 | 7/2001 |
| JP | 2001 199150 | 7/2001 |
| JP | 2001 199151 | 7/2001 |
| JP | 2001 322346 | 11/2001 |
| JP | 2005 1387 | 1/2005 |
| JP | 2006-82428 | 3/2006 |
| JP | 2006 188045 | 7/2006 |
| JP | 2006 517158 | 7/2006 |
| JP | 2006-249396 | 9/2006 |
| JP | 2007 100071 | 4/2007 |
| JP | 4001371 | 8/2007 |
| JP | 2007 276387 | 10/2007 |
| WO | 00 06390 | 2/2000 |
| WO | WO 2006/104157 A1 | 10/2006 |

OTHER PUBLICATIONS

U.S. Appl. No. 12/158,550, filed Jun. 20, 2008, Goto, et al.
U.S. Appl. No. 12/091,129, filed Apr. 22, 2008, Goto.
Office Action issued Sep. 7, 2011, in Chinese Patent Application No. 200980102383.0 (with English-language translation).

* cited by examiner

IMAGE FORMING METHOD AND IMAGE FORMED RECORD

TECHNICAL FIELD

The present invention relates to an image forming method and image formed record using an inkjet technology. Specifically, the present invention relates to an image forming method including applying a pretreatment liquid to a surface of regular paper having no coat layer, and forming an image using an inkjet recording ink. An image formed record obtained by the image forming method has excellent image quality, particularly, excellent image density and color saturation, and less color bleeding, feathering and white spots, and less smear adhesion (also referred to as excellent rubfastness) in an image part.

BACKGROUND ART

Recently, inkjet printers have been rapidly come into wide use, because they can print on regular paper, are easily used for colorization, compact and inexpensive, and its running cost is relatively low.

On the other hand, the image forming method is likely to cause an image failure, typified by a character feathering (hereinafter referred to as feathering), which is attributable to some combinations with a recording medium, thus greatly degrading image quality. The feathering is attempted to be decreased by suppressing ink permeability. In this case, however, due to poor dryness of the ink, the ink adheres to a hand by touching a print after printing, or an image may be smeared.

Moreover, a color image is printed by superimposing different colors of ink one after another, causing bleeding of color ink at a color boundary portion or causing a non-uniform mixture (hereinafter referred to as "color bleeding"), thus substantially decreasing the image quality. Increasing the ink permeability is being tried for solving the problem, namely, for decreasing the color bleeding. In this case, however, as a colorant enters inside of the recording medium, image density may be decreased and the permeation of the ink to a back of a recording medium is increased. As a result, double face printing may not be suitably performed. Therefore, an image forming method, which solves the above problems at the same time and increases the image quality, has been desired.

To the above problems, a method of using a treatment liquid containing fine particles in combination with a recording liquid is proposed. For example, Patent Literature 1 discloses an inkjet recording method, wherein a colorless liquid containing silica fine particles is deposited to a recording medium, and then a non-aqueous recording liquid containing oil black is deposited thereto.

Moreover, Patent Literature 2 discloses an inkjet recording method, wherein fine resin particles or titanium dioxide fine particles, or a solution containing these fine particles and a binder polymer is applied or jetted, before a recording liquid containing a pigment and resin is discharged.

Moreover, Patent Literature 3 discloses an image forming method, wherein a colorless inkjet treatment liquid containing an anionic metal oxide colloid, and an ink containing a colorant and no resin content are separately discharged, and then mixed to form an image on a recording medium.

Each of Patent Literatures 1 and 3, however, discloses a combination of the recording liquid containing the anionic colorant with the treatment liquid containing anionic fine particles, which is unable to obtain aggregation effect and absorption effect of the colorant, thereby failing in suppression of feathering and color bleeding. Patent Literature 2 discloses a combination of the anionic colorant with the cationic titanium dioxide, which enables to obtain a certain effect on aggregation and absorption of the colorant, however, does not show a satisfactory effect on the suppression of feathering and color bleeding.

Moreover, Patent Literature 4 discloses an image forming method including a step of adsorbing on a fine particle surface a colorant that is in a single-molecule state in a liquid droplet and a step of causing aggregation of the fine particles on which surface the colorants are adsorbed.

Patent Literature 5 discloses an ink set, wherein colorant aggregation is caused by pH of a mixture, in which an ink and liquid composition are mixed substantially at a ratio of 1 to 1 by weight.

Patent Literature 6 discloses a liquid composition containing fine particles which are dispersed in such a state that the surfaces are charged with a polarity opposite to that of an aqueous ink.

Although exhibiting a certain effect on aggregation and absorption of the colorant, each of the above Patent Literatures is, however, unable to achieve a sufficient effect on the suppression of feathering and color bleeding. Moreover, in these proposals of using the treatment liquid containing fine particles, another problem occurs in terms of fixing ability of the recording liquid. Specifically, the treatment liquid and the recording liquid are deposited to the recording medium and then a vehicle permeates the recording medium, thereby accumulating a mixture of the fine particles with the colorant on a surface of the recording medium. The thus formed accumulation is mechanically vulnerable, and may be easily removed by rubbing by hand and the like. Therefore, ink smears a user's hand and backface of overlapped prints, resulting in failure of poor rubfastness.

In terms of poor rubfastness, Patent Literature 7 discloses an inkjet recording method, wherein a first liquid containing a reaction agent, which causes aggregation upon contacting a fine polymer particle (i.e. a water-dispersible resin) or an ink composition, and the ink composition containing the fine polymer particles are deposited onto a recording medium, to thereby carry out printing.

In the composition of Patent Literature 7, as a colorant itself does not have a function for improving rubfastness, a large amount of polymer particles is necessary to obtain a sufficient rubfastness. However, the addition of a large amount of polymer particles may cause side effects, such as decreased discharge stability, decreased storage stability, increased viscosity and the like. Thus, problems have not been solved yet.

Moreover, Patent Literature 8 discloses a recording method by an inkjet print, wherein a semi-transparent white ink consisting of an inorganic oxide pigment, a dispersant and/or a polymer compound, water-soluble organic solvent and water is previously deposited onto a recording medium, and then an image is recorded using a water-soluble dye ink. Similarly, in the composition of Patent Literature 8, as a colorant itself does not have a function for improving rubfastness, the addition of a large amount of polymer particles is necessary to obtain a sufficient rubfastness. Thus, problems have not been solved yet.

Furthermore, conventionally, inkjet recording methods have been known, in which a pretreatment liquid containing a cationic group-containing material is deposited onto a recording medium, and then printing is performed using an inkjet recording ink. Patent Literature 9 discloses an inkjet recording method, wherein a colorless or light-colored liquid containing two or more cationic groups per molecule is deposited onto a recording medium, and then the liquid permeates in the recording medium, and immediately after the liquid is present in the recording medium and disappears from a surface thereof, an ink containing an anionic dye is deposited to a portion where the liquid has been deposited so as to form an image. Moreover, Patent Literature 10 discloses an inkjet recording method, wherein a colorless or light-colored liquid containing a multivalent metal salt is deposited onto a recording medium, and then the liquid permeates the recording medium, and immediately after the liquid is present in the recording medium and disappears from a surface thereof, an ink containing a dye having an oxide-group is deposited to a portion where the liquid has been deposited so as to form an image. Patent Literature 11 discloses an inkjet recording method, wherein a colorless or light-colored liquid containing a quaternary ammonium salt or an amine salt whose molecule has one or more groups selected from an alkyl group, an alkenyl group and an aryl group, all of which have carbon atoms of 4 or more, is deposited onto a recording medium, then the thus deposited liquid permeates the recording medium, and immediately after the liquid disappears from a surface thereof, an ink containing a water-soluble dye having an acidic group is deposited to a portion where the liquid has been deposited so as to form an image.

However, in, the method disclosed in Patent Literature 9 alkali is added in the pretreatment liquid to capture an anionic dye in the ink, in the method disclosed in Patent Literature 10 a strong alkali salt of organic acid is added to capture an anionic dye, and in Patent Literature 11 onium salt or amine salt is used to capture an anionic dye. The methods disclosed in the above Patent Literatures are insufficient to achieve the enhancement of image density, less feathering and less color mixture. Additionally, the methods are insufficient to achieve rubfastness in an image formed part. The Patent Literatures 9 to 11 do not suggest that it is necessary to further apply an organic acid to an essentially mild acidic medium. Moreover, these ambiguous conventional and broadly known technological concepts do not suggest a pretreatment liquid having a certain and specific composition which is suitable for inkjet printing performed using a pigment ink on regular paper having no coat layer.

Patent Literature 1: Japanese Patent Application Laid-Open (JP-A) No. 04-259590 (Claim in lines 1 to 7, column 1, page 2, paragraphs [0010], [0015] and [0022])

Patent Literature 2: JP-A No. 06-92010 (Claim 1 in lines 2 to 8, column 1, page 2, a paragraph [0010])

Patent Literature 3: JP-A No. 11-228890 (Claim in lines 1 to 27, column 1, page 2)

Patent Literature 4: JP-A No. 2001-199149 (Claim 2 in lines 13 to 21, column 1, page 2)

Patent Literature 5: JP-A No. 2001-199150 (Claim 1 in lines 2 to 9, column 1, page 2)

Patent Literature 6: JP-A No. 2001-199151 (Claim 1 in lines 2 to 7, column 1, page 2)

Patent Literature 7: International Publication No. WO 00/06390 (Lines 2 to 6 in page 2, claim 1)

Patent Literature 8: JP-A No. 2001-171095 (Claim 1 in lines 2 to 7, column 1, page 2)

Patent Literature 9: Japanese Patent (JP-B) No. 2667401 (Claim 1 in Lines 2 to 7, column 1, page 1)

Patent Literature 10: JP-B No. 2675001 (Claim 1 in lines 2 to 7, column 1, page 1)

Patent Literature 11: JP-B No. 2711098 (Claim 1 in lines 2 to 9, column 1, page 1)

DISCLOSURE OF INVENTION

The present invention is made to solve the above-mentioned conventional problems, and achieve the following object. An object of the present invention is to provide an image forming method including applying a pretreatment liquid to a surface of regular paper having no coat layer, and forming an image thereon using an inkjet recording ink, so as to obtain an image of excellent image quality such as excellent image density and color saturation, and less color bleeding, feathering and white spots, and less smear adhesion in an image part, and to provide an image formed record.

In the present invention, a cationic polymer compound in combination with a water-soluble organic acid are contained in a pretreatment liquid, which is preliminary applied on a surface of regular paper as a print medium, so as to exhibit synergistic effect that a pigment colorant tends to remain on the surface of regular paper. Moreover, a surfactant to decrease the surface tension of a precoat liquid (pretreatment liquid) is also contained in a pretreatment liquid, to thereby achieve higher density and color saturation.

The means for solving the aforementioned problems are as follows:

<1> An image forming method including applying a pretreatment liquid to a recording medium, and discharging an inkjet recording ink dropwise according to an image signal to form an image on the recording medium on which the pretreatment liquid has been applied, wherein the recording medium is regular paper which has no coat layer, the pretreatment liquid contains a cationic polymer compound, a surfactant A, water and a water-soluble organic acid, and the inkjet recording ink contains a water-dispersible colorant, a water-soluble organic solvent, a surfactant B, a penetrating agent and water, and wherein the pretreatment liquid has a static surface tension of 20 mN/m to 30 mN/m.

<2> The image forming method according to <1>, wherein the colorant contained in the inkjet recording ink is a resin coated pigment or self-dispersible pigment, and the self-dispersible pigment is contained with a water-dispersible resin in the inkjet recording ink.

<3> The image forming method according to any one of <1> and <2>, wherein the cationic polymer compound contains a cationic polymer compound of quaternary ammonium salt.

<4> The image forming method according to any one of <1> to <3>, wherein the surfactant A contains a nonionic fluorine surfactant or a nonionic silicone surfactant.

<5> The image forming method according to any one of <1> to <4>, wherein the pretreatment liquid is applied to the surface of the recording medium so that a coated amount is 0.1 g/m$^2$ to 10 g/m$^2$ on a dry basis.

<6> The image forming method according to any one of <1> to <5>, wherein the organic acid has a pKa of 5 or less.

<7> The image forming method according to any one of <1> to <6>, wherein the inkjet recording ink has a static surface tension of 20 mN/m to 35 mN/m.

<8> The image forming method according to any one of <1> to <7>, wherein the surfactant B is at least one selected from the group consisting of a nonionic fluorine surfactant, an anionic fluorine surfactant and a silicone surfactant.

<9> The image forming method according to any one of <1> to <8>, wherein the water-soluble organic solvent contains at least a polyhydric alcohol having an equilibrium moisture content of 40% by mass or more in an atmosphere at a temperature of 23° C. and a relative humidity of 80%.

<10> An image formed record produced by the image forming method according to any one of <1> to <9>.

As can be seen from the specific examples hereinbelow, the conventional problems described above are solved according to the present invention.

The present invention can provide a method for forming an image, including applying a specific pretreatment liquid to a surface of regular paper having no coat layer, and forming an image thereon using an inkjet recording ink containing a specific colorant, to obtain excellent image quality such as excellent image density and color saturation, and less color bleeding, feathering and white spots, and smear adhesion in an image part, and to provide an image formed record.

The present invention can provide an image forming method and image formed record, which exhibits, even on regular paper, excellent image quality, in particular, excellent image density and color saturation, and less color bleeding, feathering and white spots, and moreover excellent image fastness such as water-resistance, lightfastness, rubfastness, and the like.

BEST MODE FOR CARRYING OUT THE INVENTION

Figure 1:
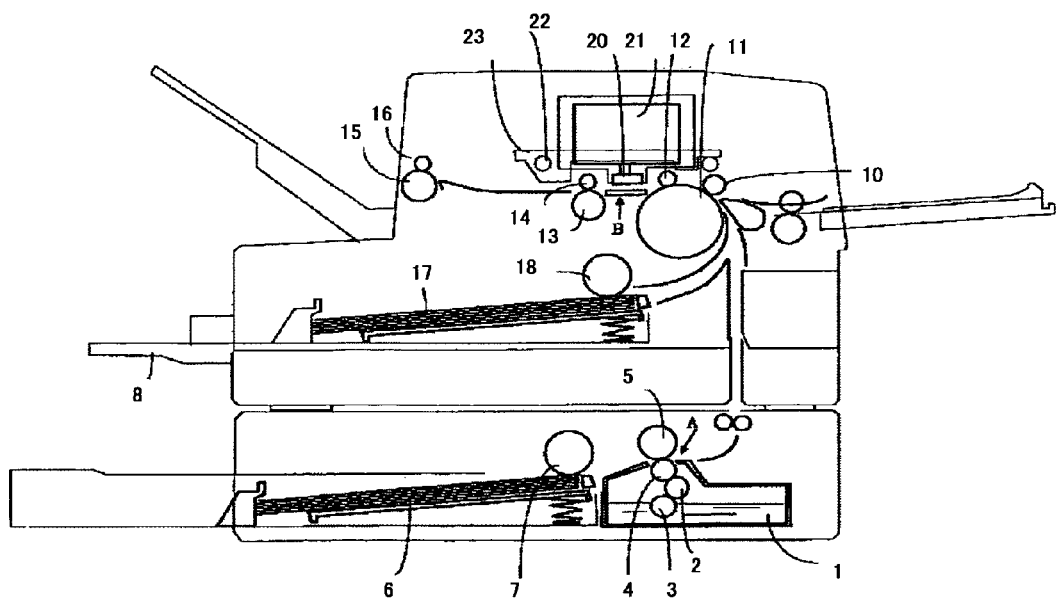
FIG. 1 is an example of a cross-sectional side view of an apparatus which is an embodiment of the present invention.

An image forming method including applying a pretreatment liquid to a recording medium, discharging an inkjet recording ink dropwise according to an image signal and depositing the inkjet recording ink on the recording medium on which the pretreatment liquid has been applied so as to form an image, wherein the recording medium is regular paper which has no coat layer, the pretreatment liquid contains at least a cationic polymer compound, a surfactant A, water and a water-soluble organic acid, and the inkjet recording ink contains at least a water-dispersible colorant, a water-soluble organic solvent, a surfactant B, a penetrating agent and water, and wherein the pretreatment liquid has a static surface tension of 20 mN/m to 30 mN/m.

<Pretreatment>

Pretreatment can be performed by uniformly coating on a surface of regular paper with the following pretreatment liquid by means of a coating method. The pretreatment exhibits outstanding effect on a sufficiently dried or not dried surface of regular paper.

The coated amount of the pretreatment is preferably 0.1 g/m² to 10 g/m² to 5 g/m² on a dry basis. When the coated amount on a dry basis is less than 0.1 g/m², an image quality, such as image density, color saturation, color bleeding, feathering and white spots, is hardly improved. When it is more than 10 g/m², the texture as regular paper may be lost, and the image quality may not be further improved, and it is not economically preferable.

A pretreatment liquid mainly contains at least a cationic polymer compound, a surfactant, water and a water-soluble organic acid. Additionally, it may also contain a water-soluble organic solvent and the like, which are used for a recording ink which will be explained below, although it depends on coating methods.

<Pretreatment Liquid>

As the cationic polymer compound used for the pretreatment liquid, a cationic polymer compound of quaternary ammonium salt is preferably used. Examples thereof include dialkyl allyl ammonium chloride polymer, dialkyl aminoethyl (meth)acrylate quaternary ammonium salt polymer, modified polyvinyl alcohol dialkyl ammonium salt polymer and dialkyl diallyl ammonium salt polymer. Examples of the cationic polymer compound include cationic specially-modified polyamine compounds, cationic polyamide polyamine compounds, cationic urea-formalin resin compounds, cationic polyacrylamide compounds, cationic alkyl ketene dimmers, cationic dicyandiamide compounds, cationic dicyandiamide-formalin condensation compounds, cationic dicyandiamide-polyamine condensation compounds, cationic polyvinyl formamide compounds, cationic polyvinyl pyridine compounds, cationic polyalkylene polyamine compounds and cationic epoxy polyamide compounds.

Particularly preferable compounds are as follows:

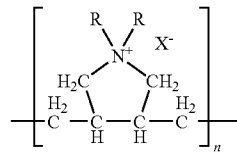

General Formula I where R represents methyl or ethyl; X⁻ represents a halogen ion; and n represents an integer.

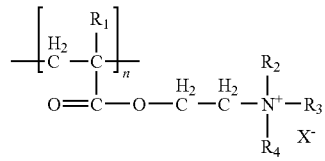

General Formula II where X⁻ represents an anion selected from a halogen ion, nitric acid ion, nitrous acid ion and acetic acid ion; $R_1$ represents H or $CH_3$, $R_2$, $R_3$ and $R_4$ each represents H or an alkyl group; and n represents an integer.

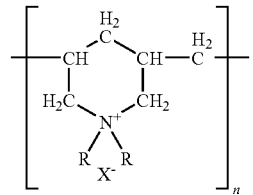

General Formula III where R represents a methyl group or ethyl group; X⁻ represents an anion selected from a halogen ion, nitric acid ion, nitrous acid ion and acetic acid ion; and n represents an integer.

The cationic polymer compound influences on aggregation of the colorant and the water-dispersible resin, and then the colorant is remained on the surface of regular paper, thereby enhancing image quality, i.e. improved image density and less characteristic bleeding. Moreover, the organic acid for use, which is a material for enhancing image quality, is selected depending on kinds and qualities of recording media (recording paper), however, a water-soluble organic acid having an acid dissociation constant (pKa) of 5 or less significantly enhances image quality and is preferably used.

Examples of the organic acid which significantly enhances image quality include ascorbic acid (pKa: 4.17), aspartic acid (pKa: 1.88), citric acid (pKa: 3.13), tartaric acid (pKa: 2.93), gluconic acid (pKa: 2.2), glutamic acid (pKa: 2.2), succinic acid (pKa: 4.21), salicylic acid (pKa: 2.97), oxalic acid (pKa:

1.04), malic acid (pKa: 3.4), lactic acid (pKa: 3.83), pyruvic acid (pKa: 2.49), fumaric acid (pKa: 3.02), malonic acid (pKa: 2.05), adipic acid (pKa: 4.42) and phytic acid. Additionally, salts of those organic acids are also effective on the enhancement of image quality.

The amount of the organic acid depends on the pKa value, etc. of the organic acid, and it is preferably approximately 0.1% by mass to 5% by mass, and more preferably approximately 0.1% by mass to 3% by mass in the total amount of the pretreatment liquid. Moreover, the static surface tension of the pretreatment liquid is adjusted in a range of 20 mN/m to 30 mN/m, so that the wettability of a surface of regular paper is improved so as to enhance image quality, i.e. improved color saturation and less white spots. In order to adjust the static surface tension of the pretreatment liquid within a range of 20 mN/m to 30 mN/m, a surfactant A is preferably used, which is similar to a surfactant B used for a recording ink. In the present invention, by using the surfactant which decreases a surface tension of a precoat liquid (pretreatment liquid) in the pretreatment liquid, higher density and higher color saturation can be achieved. However, even if the surfactant A is specified, a small amount of the specific surfactant cannot adjust the static surface tension to less than 20 mN/m. Thus, the lower limit of the static surface tension of the pretreatment liquid is determined as 20 mN/m.

Particularly, a nonionic surfactant is suitably used, and at least one selected from silicone surfactants and fluorine surfactants is preferably used. These surfactants may be used alone or in combination.

As the fluorine surfactants, those having fluorine-substituted carbon atoms of 2 to 16 are preferred, and those having fluorine-substituted carbon atoms of 4 to 16 are more preferred. When the fluorine-substituted carbon atoms are less than 2, the effect of fluorine may not be attained. When the fluorine-substituted carbon atoms are more than 16, problems may occur, for example, in ink storage stability.

Examples of the fluorine surfactants include perfluoroalkyl sulfonic acid compounds, perfluoroalkyl carboxyl acid compounds, perfluoroalkyl phosphoric acid ester compounds, perfluoroalkyl ethylene oxide adducts and polyoxyalkylene ether polymer compounds each having a perfluoroalkyl ether group in the side-chain. Of these, polyoxyalkylene ether polymer compounds each having a perfluoroalkyl ether group in the side-chain are particularly preferred because of low foaming property.

The fluorine surfactant expressed by General Formula IV is more preferred.

$$CF_3CF_2(CF_2CF_2)_m\text{—}CH_2CH_2O(CH_2CH_2O)_nH \quad \text{General Formula IV}$$

where m represent an integer of 0 to 10, and n represents an integer of 1 to 40.

Examples of the perfluoroalkyl sulfonic acid compounds include perfluoroalkyl sulfonic acids and perfluoroalkyl sulfonate salts.

Examples of the perfluoroalkyl carboxylic compounds include perfluoroalkyl carboxylic acids and perfluoroalkyl carboxylate salts.

Examples of the perfluoroalkyl phosphoric acid ester compounds include perfluoroalkyl phosphoric acid esters and salts of perfluoroalkyl phosphoric acid esters.

Examples of the polyoxyalkylene ether polymer compounds having a perfluoroalkyl ether group in the side-chain include polyoxyalkylene ether polymers having a perfluoroalkyl ether group in the side-chain, sulfate ester salts of polyoxyalkylene ether polymer having a perfluoroalkyl ether group in the side-chain, and salts of polyoxyalkylene ether polymers having a perfluoroalkyl ether group in the side-chain.

Examples of counter ions of salts in the fluorine surfactants include Li, Na, K, $NH_4$, $NH_3CH_2CH_2OH$, $NH_2(CH_2CH_2OH)_2$, and $NH(CH_2CH_2OH)_3$.

As the fluorine surfactants, appropriately synthesized surfactants or commercially available products may be used.

Examples of commercially available products include SURFLON S-111, S-112, S-113, S-121, S-131, S-132, S-141, S-145 (manufactured by Asahi Glass Co., Ltd), FLORARD FC-93, FC-95, FC-98, FC-129, FC-135, FC-170C, FC-430, FC-431 (manufactured by Sumitomo 3M Limited), MEGAFAC F-470, F1405, and F-474 (manufactured by DIC Corporation), ZONYL TBS, FSP, FSA, FSN-100, FSN, FSO-100, FSO, FS-300, and UR (manufactured by DuPont), FT-110, FT-250, FT-251, FT-400S, FT-150, FT-400SW (manufactured by NEOS Company Limited), and POLYFOX PF-136A, PF-156A, PF-151N, PF-154, PF-159 (manufactured by Omnova Solutions Inc.). Of these, ZONYL FS-300 (manufactured by DuPont), FT-110, FT-250, FT-251, FT-400S, FT-150, FT-400SW (manufactured by NEOS Company Limited), and POLYFOX PF-151N (manufactured by Omnova Solutions Inc.) are particularly preferred in terms of being excellent in print quality, in particular significantly improving color development, and level dyeing property to paper.

The silicone surfactant is not particularly limited and may be appropriately selected depending on the purpose. Examples thereof include polydimethylsiloxanes with modified side chains, polydimethylsiloxanes with modified both ends, polydimethylsiloxane with modified one end, and polydimethylsiloxane with modified side chains and both ends. Particularly preferably are polyether modified silicone surfactants having polyoxyethylene groups or polyoxyethylene polyoxypropylene groups, as the modifying groups, in view of appropriate properties as aqueous surfactants.

As these surfactants, those appropriately synthesized or commercially available products may be used. Examples thereof include those available from BYK Chemie GmbH, Shin-Etsu Chemical Co., Ltd, Dow Corning Tray Co., Ltd, NIHON EMULSION Co., Ltd., KYOEISHA CHEMICAL CO., LTD.

The polyether-modified silicone surfactant is not particularly limited and may be appropriately selected depending on the purpose, for example, it may be the compounds expressed by the formula below in which polyalkyleneoxide units are introduced into Si-side chains of dimethylpolysiloxanes.

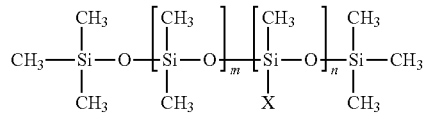

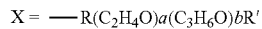

where m, n, a and b each represents an integer; R and R' each represents an alkyl group or an alkylene group.

As the polyether-modified silicone surfactants, commercially available products may be used. Examples thereof include KF-618, KF-642 and KF-643 (manufactured by Shin-Etsu Chemical Co., Ltd.), EMALEX-SS-5602, SS-1906EX (manufactured by Nihon-Emulsion Co., Ltd.), FZ-2105, FZ-2118, FZ-2154, FZ-2161, FZ-2162, FZ-2163, FZ-2164 (manufactured by Dow Corning Toray Co., Ltd.), and BYK-331, BYK-387 (manufactured by BYK Chemie GmbH).

In some cases, the pretreatment liquid may optionally contain materials, water-soluble organic solvents and antiseptic agents, used for a recording ink.

Next, a coating step will be briefly explained below.

<Coating Method>

The coating method is not particularly limited as long as the pretreatment liquid can be uniformly coated on a surface of regular paper. Examples thereof include blade coating, gravure coating, gravure offset coating, bar coating, roll coating, knife coating, air knife coating, comma coating, U-comma coating, AKKU coating, smoothing coating, micro gravure coating, reverse roll coating, 4-roll or 5-roll coating, dip coating, curtain coating, slide coating and die-coating.

After the pretreatment liquid is coated, a drying step is performed as necessary. For the drying step, drying by a roll heater or drum heater, and warm air drying are preferred.

Next, an inkjet recording ink will be explained below.

<Water-Soluble Organic Solvent (Wetting Agent)>

The recording ink of the present invention preferably contains, as the water-soluble organic solvent (i.e. a wetting agent), at least one polyhydric alcohol having an equilibrium moisture content of 40% by mass or more in an atmosphere at a temperature of 23° C. and a relative humidity of 80%, for example, the recording ink contains a wetting agent A having a significantly high boiling point and viscosity and a wetting agent B having a relatively low boiling point and viscosity.

Among polyhydric alcohols, examples of the wetting agent A having a boiling point of 250° C. or more at normal pressure include 1,2,3-butanetriol, 1,2,4-butanetriol, (BP: 190° C./24 hPa to 191° C./24 hPa), glycerin (BP: 290° C.), diglycerin (BP: 270° C./20 hPa), triethylene glycol (BP: 285° C.), and tetraethylene glycol (BP: 324° C. to 330° C.). Examples of the wetting agent B having a boiling point of 140° C. or more to less than 250° C. include diethylene glycol (BP: 245° C.), and 1,3-butandiol (BP: 203° C. to 204° C.).

These wetting agents A and B are materials having a moisture absorption, wherein an equilibrium moisture content is 40% by mass or more in an atmosphere at a temperature of 23° C. and a relative humidity of 80%. The evaporativity of the wetting agent B is relatively higher than that of the wetting agent A. Those selected from the group consisting of glycerin and 1,3-butanediol are particularly preferred. When the combination of the wetting agent A and wetting agent B is used, the mass ratio of wetting agent B to wetting agent A (B/A) is not categorically defined because it depends not a little on the amount of a wetting agent C which will be described later, and the kinds and amount of other additives such as a penetrating agent. For example, the mass ratio (B/A) is preferably 10/90 to 90/10.

The equilibrium moisture content of the present invention is obtained in such a manner that the inside of a desiccator is kept at a temperature of 23±1° C. and a relative humidity of 80±3% using a saturated aqueous solution of potassium chloride, in the desiccator dishes each containing weighed 1 g of the water-soluble organic solvent are stored, and then a saturated water content is obtained.

Saturated water content (%)=(water content absorbed in an organic solvent/the organic solvent)×100

When 50% by mass or more of the polyhydric alcohol is used relative to the total amount of the wetting agent, excellent discharge stability is secured.

In the recording ink of the present invention, the wetting agents A and B are partially replaced with, or are combined with a wetting agent C, as necessary.

Examples of the wetting agent C include polyhydric alcohols, polyhydric alcohol alkylethers, polyhydric alcohol arylethers, nitrogen-containing heterocyclic compounds, amides, amines, sulfur-containing compounds, propylene carbonate, ethylene carbonate and other wetting agents.

Examples of the polyhydric alcohols include dipropylene glycol (BP: 232° C.), 1,5-pentandiol (BP: 242° C.), 3-methyl-1,3-butanediol (BP: 203° C.), propylene glycol (BP: 187° C.), 2-methyl-2,4-pentanediol (BP: 197° C.), ethylene glycol (BP: 196° C. to 198° C.), tripropylene glycol (BP: 267° C.), hexylene glycol (BP: 197° C.), polyethylene glycol (viscous liquid to solid), polypropylene glycol (BP: 187° C.), 1,6-hexanediol (BP: 253° C. to 260° C.), 1,2,6-hexanetriol (BP: 178° C.), trimethylolethane (solid, MP: 199° C. to 201° C.) and trimethylolpropane (solid, MP: 61° C.).

Examples of the polyhydric alcohol alkyl ethers include ethylene glycol monoethyl ether (BP: 135° C.), ethylene glycol monobutyl ether (BP: 171° C.), diethylene glycol monomethyl ether (BP: 194° C.), diethylene glycol monoethyl ether (BP: 197° C.), diethylene glycol monobutyl ether (BP: 231° C.), triethylene glycol mono-2-ethylhexyl ether (BP: 229° C.), and propylene glycol monoethyl ether (BP: 132° C.).

Examples of the polyhydric alcohol aryl ethers include ethylene glycol monophenyl ether (BP: 237° C.) and ethylene glycol monobenzyl ether.

Examples of the nitrogen-containing heterocyclic compounds include N-methyl-2-pyrrolidone (BP: 202° C.), 1,3-dimethyl-2-imidazolidinone (BP: 226° C.), ε-caprolactam (BP: 270° C.) and γ-butyrolactone (BP: 204° C. to 205° C.).

Examples of the amides include formamide (BP: 210° C.), N-methylformamide (BP: 199° C. to 201° C.), N,N-dimethyl formamide (BP: 153° C.) and N,N-diethyl formamide (BP: 176° C. to 177° C.).

Examples of the amines include monoethanolamine (BP: 170° C.), diethanolamine (BP: 268° C.), triethanolamine (BP: 360° C.), N,N-dimethyl monoethanolamine (BP: 139° C.), N-methyldiethanolamine (BP: 243° C.), N-methylethanolamine (BP: 159° C.), N-phenylethanolamine (BP: 282° C. to 287° C.) and 3-aminopropyldimethylamine (BP: 169° C.).

Examples of the sulfur compounds include dimethylsulfoxide (BP: 139° C.), sulfolan (BP: 285° C.), and thiodiglycol (BP: 282° C.).

As other solid wetting agents, saccharides are preferably used. Examples of the saccharides include monosaccharides, disaccharides, oligosaccharides (including trisaccharides and tetrasaccharides) and polysaccharides. Specific examples thereof include glucose, mannose, fructose, ribose, xylose, arabinose, galactose, maltose, cellobiose, lactose, sucrose, trehalose, and maltotriose. The polysaccharides mean sugars in a broad sense and may include substances widely present in nature, such as α-cyclodextrin and cellulose. Examples of the derivatives of the saccharides include reduced sugar of the saccharides (for example, sugar alcohol, expressed by a general formula $HOCH_2(CHOH)nCH_2OH$, where n represents an integer of 2 to 5), oxidized sugar (for example, aldonic acid and uronic acid), amino acids, and thio acid. Of these, sugar alcohol is preferred. Examples of sugar alcohols include maltitol and sorbitol.

The mass ratio of the pigment to the wetting agent significantly affects the ink discharge stability from ink heads. When the amount of wetting agent is insufficient compared to the solid content of pigment, water evaporation near the ink meniscus of nozzles may result in discharge failure. The amount of the wetting agent in the recording ink is preferably 20% by mass to 50% by mass, and more preferably 20% by mass to 45% by mass. When the amount is less than 20% by mass, the ink tends to decrease discharge stability and waste ink fixes in a supporting device, meanwhile when the amount is more than 50% by mass, the drying velocity is lower on paper surface, which may also impair printing quality of characters on regular paper.

In order to enhance image quality of regular paper, as a wetting agent other than polyhydric alcohols having an equilibrium moisture content of 40% by mass or more, a wetting agent B1 (water-soluble organic solvent) having a boiling point of less than 240° C. and an equilibrium moisture content of less than 40% by mass is preferably added in the ink in an appropriate proportion. The amount of the water-soluble organic solvent is preferably used in an amount of less than 50% by mass of the total amount of the wetting agent in terms of securing discharge stability.

<Colorant>

As a colorant, a pigment is primarily used in terms of weather resistance. However, in order to adjust a color tone, a dye may be contained in an amount where weather resistance is not decreased.

Moreover, the pigment is not particularly limited, and may be appropriately selected depending on the purpose. Examples thereof include pigments for black and pigments for color. These may be used alone or in combination.

Examples of the inorganic pigments include titanium oxide, iron oxide, calcium carbonate, barium sulfate, aluminum hydroxide, barium yellow, cadmium red and chromium yellow. Additionally, carbon black, which is produced by the publicly known methods such as a contact method, furnace method and thermal method, can be used.

Examples of the organic pigments include azo pigments, such as azo lakes, insoluble azo pigments, condensed azo pigments, and chelate azo pigments; polycyclic pigments such as phthalocyanine pigments, perylene pigments, perinone pigments, anthraquinone pigments, quinacridone pigments, dioxadine pigments, indigo pigments, thioindigo pigments, isoindolinone pigments and quinophthalone pigments; dye chelates, such as basic dye chelates and acidic dye chelates; nitro pigments, nitroso pigments, and aniline black. Of these, pigments having hydrophilic nature are preferably used.

Of these pigments, examples of pigments which are more preferably used are specified below:

Examples of the pigments for black include carbon black (C.I. pigment black 7) such as furnace black, lamp black, acetylene black and channel black; metal such as copper, iron (C.I. pigment black 11) and titanium oxide; organic pigments such as aniline black (C.I. pigment black 1).

Examples of the pigments for color other than black include C.I. pigment yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, 183; C.I. pigment orange 5, 13, 16, 17, 36, 43, 51; C.I. pigment red 1, 2, 3, 5, 17, 22, 23, 31, 38, 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, 219; C.I. pigment violet 1 (rhodamine lake), 3, 5:1, 16, 19, 23, 38; C.I. pigment blue 1, 2, 15, 15:1, 15:2, 15:3 (phthalocyanine blue), 16, 17:1, 56, 60, 63; and C.I. pigment green 1, 4, 7, 8, 10, 17, 18, 36.

Particularly preferable embodiments when the pigment is used as the colorant are exemplified as follows:

1) In the first embodiment, the colorant contains a polymer emulsion which is composed of fine polymer particles containing a water-insoluble and/or hardly water-soluble colorant (an aqueous dispersion of fine polymer particles containing a colorant, i.e. resin coated pigment).

2) In the second embodiment, a colorant contains a pigment which has at least one hydrophilic group at its surface and is water-dispersible in the absence of a dispersant (hereinafter, referred to as "self-dispersible pigment").

In the present invention, in case of the second embodiment, it is necessary to contain a water-dispersible resin which will be explained below.

As the water-dispersible colorant in the first embodiment, in addition to the above-mentioned pigments, a polymer emulsion composed of fine polymer particles containing a pigment is preferably used. The polymer emulsion composed of fine polymer particles each containing a pigment is a fine polymer particle in which a pigment is encapsulated and/or a fine polymer particle to the surface of which a pigment is adhered. In such case, all the pigments are not necessarily encapsulated and/or adhered, and the pigment may be dispersed in the emulsion within a certain amount in which the effect of the present invention will not be spoiled. The polymers for forming the polymer emulsion (i.e. the polymers in the fine polymer particles) include vinyl polymers, polyester polymers and polyurethane polymers. The polymers particularly preferably used are vinyl polymers and polyester polymers. Those polymers are disclosed in, for example, JP-A No. 2000-53897 and JP-A No. 2001-139849.

The self-dispersible pigment in the second embodiment is surface-treated one such that at least a hydrophilic group bonds directly or through another atomic group to the surface of the pigment. The surface-treatment may be carried out by way of chemically bonding a certain functional group such as sulfonic group and carboxyl group to the surface of pigments or wet-oxidizing pigments either with hypohalous acids or their salts. Particularly preferable are water-dispersible pigments to which surface the carboxyl group bonds. Such surface-treatment with carboxyl group may improve dispersion stability, provide high-quality printing and increase water resistance of recording media after printing.

In addition, the ink containing self-dispersible pigment of the first embodiment may exhibit superior re-dispersibility even once dried, therefore there occurs substantially no clogging of nozzles even after a long-term rest and thus moisture of the ink around ink-jet head nozzles has evaporated, and then proper printing may easily regenerate after simple cleaning.

Preferably, the self-dispersible pigment has a volume average particle diameter ($D_{50}$) of 0.01 μm to 0.16 μm in the ink.

As the self-dispersible carbon black, those exhibiting ionic properties are preferred, and those having an anionic or cationic charge are more preferred.

Examples of the anionic hydrophilic groups include —COOM, —$SO_3$M, —$PO_3$HM, —$PO_3M_2$, —$SO_2NH_2$, and —$SO_2$NHCOR, in which M represents a hydrogen atom, alkaline metal, ammonium or organic ammonium; R represents an alkyl group having carbon atoms of 1 to 12, phenyl group which may be substituted by a substituent, and naphthyl group which may be substituted by a substituent. Of these, preferred are color pigments to which surface —COOM or —$SO_3$M bonds.

"M" of alkaline metals in the hydrophilic group includes, for example, lithium, sodium and potassium. Examples of the organic ammoniums include mono- or tri-methyl ammonium, mono- or tri-ethyl ammonium, and mono or tri-methanol ammonium. As for the methods for producing the anionically charged color pigments, —COONa may be introduced on the surface of color pigments by way of, for example, oxidization-treating color pigments using sodium hypochlorite, sulfonating, or reacting with a diazonium salt.

The cationic hydrophilic groups are preferably quaternary ammonium groups, and more preferably the quaternary ammonium groups shown below. Carbon blacks, to which at least one of these groups attaches, are preferable colorants in the present invention.

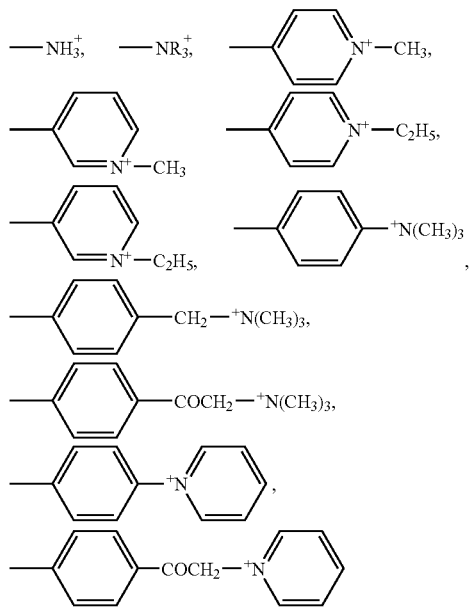

The cationic self-dispersible carbon blacks, to which hydrophilic groups bond, may be appropriately produced depending on the application; for example, N-ethylpyridyl group shown below can be attached to carbon black through treating with 3-amino-N-ethylpyridinium bromide.

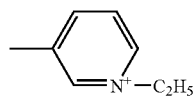

The hydrophilic groups may be attached to the surface of carbon black through another atomic group. The another atomic group may be alkyl groups having carbon-atoms of 1 to 12, phenyl groups which may be substituted by a substituent, and naphthyl groups which may be substituted by a substituent. Specific examples of the hydrophilic groups through another atomic groups attached to the surface of carbon black are —$C_2H_4COOM$ (M represents an alkaline metal or quaternary ammonium), -$PhSO_3M$ (Ph represents a phenyl group, and M represents an alkaline metal or quaternary ammonium), and —$C_5H_{10}NH_3^+$.

The amount of the colorant is preferably 2% by mass to 15% by mass, and more preferably 3% by mass to 12% by mass, in the recording ink on the basis of solid content. When the amount is less than 2% by mass, color development of ink and image density may be significantly decreased. When the amount is more than 15% by mass, the ink viscosity may be increased excessively, causing poor discharge ability, and it is not economically preferable.

<Surfactant>

It is preferred that the surfactant be at least one selected from anionic surfactants, nonionic surfactants, silicone surfactants and fluorine surfactants, and lead to lower surface tension and higher permeability and leveling ability, and do not diminish dispersion stability in combination with kinds of colorants or wetting agents. Of these, silicone surfactants and fluorine surfactants are particularly preferred.

These surfactants may be used alone or in combination.

As fluorine surfactants, those having fluorine-substituted carbon atoms of 2 to 16 are preferred, and those having fluorine-substituted carbon atoms of 4 to 16 are more preferred. When the fluorine-substituted carbon atoms are less than 2, fluorine may not be effective. When the fluorine-substituted carbon atoms are more than 16, problems may occur for example, in ink storage stability.

Examples of fluorine surfactants include perfluoroalkyl sulfonic acid compounds, perfluoroalkyl carboxyl compounds, perfluoroalkyl phosphoric acid ester compounds, perfluoroalkyl ethylene oxide adducts and polyoxyalkylene ether polymer compounds having a perfluoroalkyl ether group in the side-chain. Of these, polyoxyalkylene ether polymer compounds having a perfluoroalkyl ether group in the side-chain are particularly preferred because of low foaming property.

The fluorine surfactant expressed by General Formula IV is more preferred.

$$CF_3CF_2(CF_2CF_2)_m\text{—}CH_2CH_2O(CH_2CH_2O)_nH \quad \text{General Formula IV}$$

where m represent an integer of 0 to 10, and n represents an integer of 1 to 40.

Examples of the perfluoroalkyl phosphoric acid ester compounds include perfluoroalkyl phosphoric acid esters and salts of perfluoroalkyl phosphoric acid esters.

Examples of the perfluoroalkyl carboxylic compounds include perfluoroalkyl carboxylic acid and perfluoroalkyl carboxylate salts.

Examples of the perfluoroalkyl phosphate ester compounds include perfluoroalkyl phosphate ester and salts of perfluoroalkyl phosphate ester.

Examples of the polyoxyalkylene ether polymer compounds having a perfluoroalkyl ether group in the side-chain include polyoxyalkylene ether polymers having a perfluoroalkyl ether group in the side-chain, sulfate ester salts of polyoxyalkylene ether polymer having a perfluoroalkyl ether group in the side-chain, and salts of polyoxyalkylene ether polymers having a perfluoroalkyl ether group in the sidechain.

Examples of counter ions of the salts in the fluorine surfactants include Li, Na, K, $NH_4$, $NH_3CH_2CH_2OH$, $NH_2(CH_2CH_2OH)_2$ and $NH(CH_2CH_2OH)_3$.

As the fluorine surfactants, appropriately synthesized surfactants or commercially available products may be used.

Examples of commercially available products include SURFLON S-111, S-112, S-113, S-121, S-131, S-132, S-141, S-145 (manufactured by Asahi Glass Co., Ltd.), FLORARD FC-93, FC-95, FC-98, FC-129, FC-135, FC-170C, FC-430, FC-431 (manufactured by Sumitomo 3M Limited), MEGAFAC F-470, F-1405, and F-474 (manufactured by DIC Corporation), ZONYL TBS, FSP, FSA, FSN-100, FSN, FSO-100, FSO, FS-300, and UR (manufactured by DuPont), FT-110, FT-250, FT-251, FT-400S, FT-150, FT-400SW (manufactured by NEOS Company Limited), and POLYFOX PF-136A, PF-156A, PF-151N, PF-154, PF-159 (manufactured by Omnova Solutions Inc.). Of these, ZONYL FS-300 (manufactured by DuPont), FT-110, FT-250, FT-251, FT-400S, FT-150, FT-400SW (manufactured by NEOS Company Limited), and POLYFOX PF-151N (manufactured by Omnova Solutions Inc.) are particularly preferred in terms of being excellent in print quality, in particular significantly improving color development, and level dyeing property to paper.

Specific examples of the fluorine surfactants are those expressed by the following structural formulas.

(1) Anionic Fluorine Surfactant

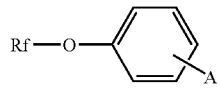

where Rf represents a mixture of fluorine-containing hydrophobic groups expressed by the following structural formulas; A represents —SO$_3$X, —COOX or —PO$_3$X (X is a counter anion, specifically a hydrogen atom, Li, Na, K, NH$_4$, NH$_3$CH$_2$CH$_2$OH, NH$_2$(CH$_2$CH$_2$OH)$_2$, or NH(CH$_2$CH$_2$OH)$_3$).

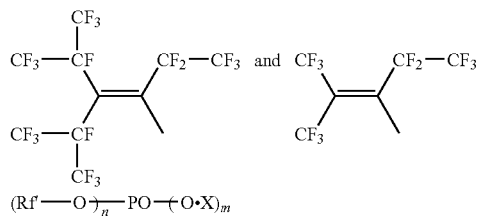

where Rf' is a fluorine-containing group expressed by the following structural formula; X represents the same as defined above, n represents an integer of 1 or 2, and m represents 2-n.

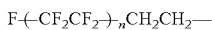

where n represents an integer of 3 to 10.

where Rf' and X respectively represent the same as defined above.

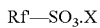

where Rf' and X respectively represent the same as defined above.

(2) Nonionic Fluorine Surfactant

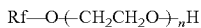

where Rf represents the same as defined above, and n represents an integer of 5 to 20.

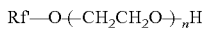

where Rf' represents the same as defined above, and n represents an integer of 1 to 40.

(3) Ampholytic Fluorine Surfactant

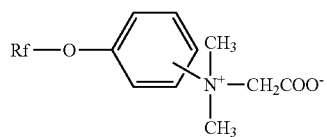

where Rf represents the same as defined above.

(4) Fluorine-Containing Oligomer Surfactant

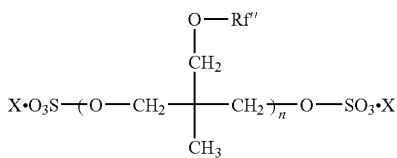

where Rf' represents a fluorine-containing group expressed by the following structural formula; n represents an integer of 0 to 10 and X represents the same as defined above.

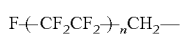

where n is an integer of 1 to 4.

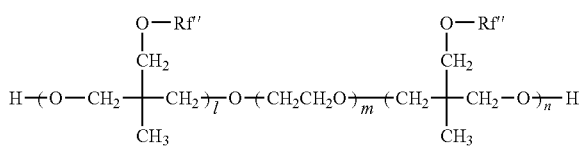

where Rf' represents the same as defined above; l, m, and n each represents an integer of 0 to 10.

The silicone surfactant is not particularly limited and may be appropriately selected depending on the purpose. Preferably are those not decomposed in a high pH environment. Examples thereof include polydimethylsiloxanes with modified side chains, polydimethylsiloxanes with modified both ends, polydimethylsiloxane with modified one end, and polydimethylsiloxane with modified side chains and both ends. Particularly preferably are polyether modified silicone surfactants having polyoxyethylene groups or polyoxyethylene polyoxypropylene groups, as the modifying groups, in view of appropriate properties as aqueous surfactants.

As these surfactants, those appropriately synthesized or commercially available products may be used. Examples thereof include those available from BYK Chemie GmbH, Shin-Etsu Silicones Co. Ltd., Dow Corning Tray Co., Ltd.

The polyether-modified silicone surfactant is not particularly limited and may be appropriately selected depending on the purpose, for example, it may be the compounds expressed by the formula below in which polyalkyleneoxide units are introduced into Si-side chains of dimethylpolysiloxanes.

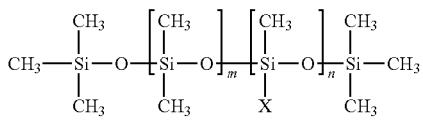

$$X = \text{—} R(C_2H_4O)a(C_3H_6O)bR'$$

where m, n, a and b each represents an integer; R and R' each represents an alkyl group or an alkylene group.

As the polyether-modified silicone surfactants commercially available products may be used. Examples thereof include KF-618, KF-642 and KF-643 (manufactured by Shin-Etsu Chemical Co., Ltd.), EMALEX-SS-5602, SS-1906EX (manufactured by Nihon-Emulsion Co., Ltd.), FZ-2105, FZ-2118, FZ-2154, FZ-2161, FZ-2162, FZ-2163, FZ-2164 (manufactured by Dow Corning Toray Co., Ltd.), BYK-331, BYK-387 (manufactured by BYK Chemie GmbH).

Examples of anionic surfactants include polyoxyethylene alkyl ether acetate, dodecylbenzene sulfonate, salts of lauric acid, and polyoxyethylene alkyl ether sulfate salts.

Examples of nonionic surfactants include polyoxyethylene alkyl ethers, polyoxypropylene polyoxyethylene alkyl ethers, polyoxyethylene alkyl esters, polyoxyethylene sorbitan fatty acid esters, polyoxyethylene alkyl phenyl ethers, polyoxyethylene alkylamines, and polyoxyethylene alkylamides.

The amount of the surfactant in the recording ink is preferably 0.01% by mass to 3.0% by mass, and more preferably 0.5% by mass to 2.0% by mass. When the amount is less than 0.01% by mass, the effect resulted from addition of the surfactants may be lost. When the amount is more than 3.0% by mass, permeability into a recording medium becomes excessively high, causing decrease of image density and strike through.

<Penetrating Agent>

As a penetrating agent, the recording ink of the present invention preferably contains at least one selected from polyol compounds which do not function as wetting agents and have carbon atoms of 8 to 11, or glycol ether compounds. The penetrating agent preferably has a solubility of 0.2% by mass to 5.0% by mass in water at 25° C. Of these, 2-ethyl-1, 3-hexanediol [solubility: 4.2% (25° C.)], and 2,2,4-trimethyl-1,3-pentanediol [solubility: 2.0% (25° C.)] are particularly preferable.

Additionally, as the polyol compounds which do not function as wetting agents, examples of aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol and 2,5-dimethyl-2,5-hexanediol, and 5-hexene-1,2-diol.

Other penetrating agents are not particularly limited and may be appropriately selected as long as they can dissolve in the ink so as to adjust physical properties to desirable ones. Examples thereof include alkyl or allyl ethers of polyhydric alcohols such as diethyleneglycol monophenylether, ethyleneglycol monophenylether, ethyleneglycol monoallylether, diethyleneglycol monophenylether, diethyleneglycol monobutylether, propyleneglycol monobutylether and tetraethyleneglycol chlorophenylether; and lower alcohols such as ethanol.

The amount of the penetrating agent in the recording ink is preferably 0.1% by mass to 4.0% by mass. When the amount is less than 0.1% by mass, drying speed may be lower, thus possibly resulting in image bleeding. When the amount is more than 4.0% by mass, dispersion stability of the colorant may be impaired, nozzle clogging may easily occur, and permeability into a recording medium becomes excessively high, causing decrease of image density and strike through.

<Water-Dispersible Resin>

As a water-dispersible resin, resins having excellent film-forming ability or image-forming ability, excellent water repellency, water resistance and weather resistance are used, and useful to record a high density image having excellent color development and water resistance. Examples thereof include condensed synthetic resins, addition synthetic resins and natural polymer compounds.

Examples of the condensed synthetic resins include polyester resins, polyurethane resins, polyepoxy resins, polyamide resins, polyether resins, poly (meth)acrylic resins, acrylic silicone resins, and fluorine resins.

Examples of the addition synthetic resins include polyolefin resins, polystyrene resins, polyvinyl alcohol resins, polyvinyl ester resins, polyacrylic resins and unsaturated carboxylic acid resins.

Examples of the natural polymer compounds include celluloses, rosins and natural rubbers.

Of these, polyurethane fine resin particles, acryl-silicone fine resin particles and fluorine fine resin particles are preferred. The water-dispersible resins used in combination causes no problem at all.

Preferred examples of the fluorine resins include fluorine fine resin particles having a fluoroolefin unit. Of such fluorine resin particles, fluorine-containing vinyl ether fine resin particles composed of fluoroolefin units and vinyl ether units are particularly preferably used.

The fluoroolefin unit is not particularly limited and may be appropriately selected depending on the purpose. Examples thereof include —$CF_2CF_2$—, —$CF_2CF(CF_3)$— and —$CF_2CFCl$—.

The vinyl ether unit is not particularly limited and may be appropriately selected depending on the purpose. Examples thereof include the compounds expressed by the following structural formulas.

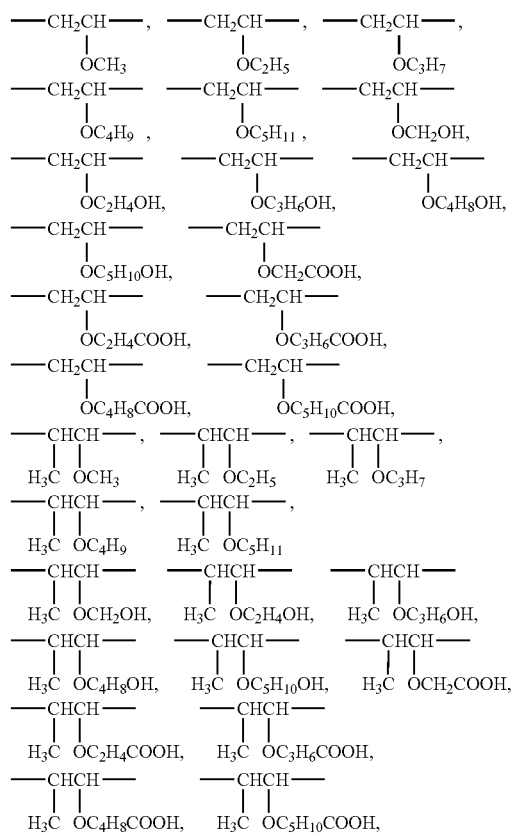

The fluorine-containing vinyl ether fine resin particles composed of fluoroolefin units and vinyl ether units are preferably alternating copolymers of the fluoroolefin units and vinyl ether units.

As such fluorine resin particles, either those appropriately synthesized or commercially available products may be used. Examples of the commercially available products include FLUONATE FEM-500 and FEM-600, DICGUARD F-52S, F-90, F-90M and F-90N, and AQUAFLUN TE-5A (all manufactured by DIC CORPORATION); LUMIFLON FE4300, FE4500 and FE4400, and ASAHI GUARD AG-7105, AG-950, AG-7600, AG-7000 and AG-1100 (all manufactured by ASAHI GLASS CO., LTD.).

The water-dispersible resin may be used as a homopolymer or may be copolymerized to be used as a composite resin. It can be formed into any one of single phase structures, core-shell structures and power-feed emulsions.

The water-dispersible resins may be a resin itself having a hydrophilic group and being self-dispersible or a resin itself having no dispersibility whereas the dispersibility is imparted by a surfactant or a resin having a hydrophilic group. Of these, ionomers of the polyester resin and polyurethane resin, and emulsions of resin particles obtained by emulsification/suspension polymerization of unsaturated monomers are preferable. In cases of emulsification polymerization of unsaturated monomers, the water-dispersible resin can be easily obtained because the resin emulsion is obtained by reacting in the water into which an unsaturated monomer, a polymerization initiator, and a surfactant, a chain transfer agent, a chelating agent and a pH adjusting agent have been added, and objective properties are easily produced because the resin constitution is easily changed.

Examples of the unsaturated monomers include unsaturated carboxylic acids, monofunctional or multifunctional (meth)acrylate ester monomers, (meth)acrylate amide monomers, aromatic vinyl monomers, vinyl cyan compound monomers, vinyl monomers, allyl compound monomers, olefin monomers, diene monomers, oligomers having unsaturated carbons. These may be used alone or in combination. Combination of these monomers enables to flexibly modify properties. The resin properties can be improved by a means of polymerization or Graft-polymerization using oligomer polymerization initiator.

Examples of the unsaturated carboxylic acids include acrylic acid, methacrylic acid, itaconic acid, fumaric acid and maleic acid.

Examples of the monofunctional (meth)acrylate ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salts, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate and acryloxyethyltrimethyl ammonium salts.

Examples of the multifunctional (meth)acrylate ester monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylol propane triacrylate, trimethylol ethane triacrylate, tetramethylol methane triacrylate, ditrimethylol tetraacrylate, tetramethylol methane tetraacrylate, pentaerythritol tetraacrylate and dipentaerythritol hexaacrylate.

Examples of the (meth)acrylate amide monomers include acrylamide, methacrylamide, N,N-dimethylacrylamide, methylenebisacrylamide and 2-acrylamide-2-methylpropane sulfonate.

Examples of the aromatic vinyl monomers include styrene, α-methylstyrene, vinyltoluene, 4-t-butylstyrene, chlorostyrene, vinyl anisole, vinyl naphthalene and divinyl benzene.

Examples of the vinylcyan compound monomers include acrylonitrile and methacrylonitrile.

Examples of the vinyl monomers include vinyl acetate, vinylidene chloride, vinyl chloride, vinyl ether, vinyl ketone, vinyl pyrrolidone, vinyl sulfonic acid and salts thereof, vinyl trimethoxysilane and vinyl triethoxysilane.

Examples of the allyl compound monomers include allyl sulfonic acid and salts thereof, allylamine, allyl chloride, diallylamine and diallyldimethyl ammonium salts.

Examples of the olefin monomers include ethylene and propylene.

Examples of the diene monomers include butadiene and chloroprene.

Examples of the oligomers having an unsaturated carbon include styrene oligomers having a methacryloyl group, styrene-acrylonitrile oligomers having a methacryloyl group, methyl methacrylate oligomers having a methacryloyl group, dimethylsiloxane oligomers having a methacryloyl group and polyester oligomers having an acryloyl group.

Since breakdowns of the molecular chain, including dispersion breaking and hydrolysis, are caused in a strong alkaline or acidic environment, pH of the water-dispersible resin is preferably 4 to 12. In particular, in terms of miscibility with a water-dispersible colorant, it is more preferably 6 to 11, and still more preferably 7 to 9.

The average-particle diameter ($D_{50}$) of the water-dispersible resin corresponds to the viscosity of the dispersion liquid. Provided composition and the solid content of the dispersion liquid remain the same, particles having smaller diameters provide higher viscosity. The water-dispersible resin preferably has an average particle diameter ($D_{50}$) of 50 nm or more for preventing ink using the water-dispersible resin from having excessively high viscosity. On the other hand, when the water-dispersible resin has an average particle diameter of several dozen micrometers, it cannot be used because the diameter is larger than the diameter of a nozzle of inkjet head. Even if the average particle diameter of the water-dispersible resin is smaller than the nozzle, those having relatively large particle diameter in an ink degrade its discharge stability. Thus, for preventing the degradation of the discharge stability, the average particle diameter ($D_{50}$) is preferably 200 nm or less and more preferably 150 nm or less.

The water-dispersible resin preferably functions as a means to fix the water-dispersible colorant onto paper, and form a film at room temperature so as to improve the fixing ability of the colorant. Therefore, it is preferred that a minimum film-forming temperature (MFT) of the water-dispersible resin be 30° C. or less. And the glass transition temperature of the water-dispersible resin is preferably −30° C. or more, because when the glass transition temperature is −40°

C. or less, the viscosity of the resin film increases, resulting in the generation of wrinkles on printed paper.

The amount of the water-dispersible resin in the recording ink is preferably 1% by mass to 15% by mass and more preferably 2% by mass to 7% by mass, based on the solid content.

The solid contents of the colorant, the pigment in the colorant and the water-dispersible resin may be measured, for example, by means of separating only the colorant and water-dispersible resin components from the ink. And when a pigment is used as the colorant, the proportion of the colorant and water-dispersible resin can be determined based on the mass reduction ratio obtained by a thermal mass analysis. When the colorant is, for example, a pigment or a dye, and its molecular structure is known, the solid content of the colorant can be determined by the nuclear magnetic resonance analysis, or NMR. When the colorant is, for example, an inorganic pigment contained in a heavy metal atom or molecular frame, a metal-containing organic pigment or a metal-containing dye, and its molecular structure is known, the solid content of the colorant can be determined by the X-ray fluorescence analysis.

<Other Components>

Other components are not particularly limited and may be appropriately selected depending on the purpose. Examples thereof include pH adjusting agents, antiseptic/antifungal agents, chelating reagents, antirust agents, antioxidants, UV absorbers, oxygen absorbers, and photostabilizers.

The pH adjusting agent is not particularly limited as long as it gives no adverse effect on the recording ink and can adjust pH within the range from 7 to 11, and may be appropriately selected depending on the purpose. Examples thereof include alcohol amines, alkali metal hydroxides, ammonium hydroxides, phosphonium hydroxides and alkali metal carbonates. When the pH is less than 7 or more than 11, the materials of an inkjet head and ink-supply unit may be dissolved, and such troubles may occur as degradation or leakage of the ink, inferior ink-ejection, or the like.

Examples of the alcohol amines include diethanolamine, triethanolamine and 2-amino-2-ethyl-1,3-propanediol.

Examples of the alkali metal hydroxides include lithium hydroxides, sodium hydroxides and potassium hydroxides.

Examples of the ammonium hydroxides include ammonium hydroxides and quaternary ammonium hydroxides.

Examples of the phosphonium hydroxides include quaternary phosphonium hydroxides.

Examples of the alkali metal carbonates include lithium carbonates, sodium carbonates and potassium carbonates.

Examples of antiseptic/antifungal agents include sodium dehydroacetate, sodium sorbate, 2-pyridinethiol-1-oxide sodium, sodium benzoate, and pentachlorophenol sodium.

Examples of the chelating reagents include sodium ethylenediamine tetraacetate, sodium nitrilotriacetate, sodium hydroxyethyl ethylenediamine triacetate, sodium diethylenetriamine pentaacetate and sodium uramil diacetate.

Examples of antirust agents include acidic sulfite, sodium thiosulfate, ammonium thiodiglycolate, diisopropyl ammonium nitrite, pentaerythritol tetranitrate, and dicyclohexylammonium nitrite.

Examples of antioxidants include phenol antioxidants (including hindered phenol antioxidants), amine antioxidants, sulfur antioxidants, and phosphorus antioxidants.

Examples of the phenol antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis(1,1-dimethyl-2-[β-(3-tert-butyl-4-hydroxy-5-methylphenyl)propionyloxy]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetraxis[methylene-3-(3',5'-di-tert-butyl-4'-hydroxyphenyl)propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraxis[methylene-3-(3,5-di-tert-butyl-4-dihydroxyphenyl)propionate]methane, and 1,1,3-tris(2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzimidazole, and dilauryl sulfite.

Examples of the phosphorous antioxidants include triphenyl phosphite, octadecyl phosphite, triisodecyl phosphite, trilauryl trithiophosphite, and trinonylphenyl phosphite.

Examples of the ultraviolet ray absorbers include benzophenone ultraviolet ray absorbers, benzotriazole ultraviolet ray absorbers, salicylate ultraviolet ray absorbers, cyanoacrylate ultraviolet ray absorbers, and nickel complex salt ultraviolet ray absorbers.

Examples of the benzophenone ultraviolet ray absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet ray absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet ray absorbers include phenyl salicylate, p-tert-butylphenyl salicylate, and p-octylphenyl salicylate.

Examples of the cyanoacrylate ultraviolet ray absorbers include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the ultraviolet ray absorbers of nickel complex salts include nickel bis(octylphenyl) sulfide, 2,2'-thiobis(4-tert-octylphelate)-n-butylamine nickel (II), 2,2'-thiobis(4-tert-octylphelate)-2-ethylhexylamine nickel (II) and 2,2'-thiobis(4-tert-octylphelate) triethanolamine nickel (II).

The recording ink of the present invention contains at least the colorant, water-soluble organic solvent (wetting agent), surfactant penetrating agent, water-dispersible resin and water, and further contains other components, as necessary. These components are dispersed or dissolved in an aqueous solvent, and further stirred and mixed as necessary, so as to produce the recording ink of the present invention. The dispersing may be performed by a sand mill, a homogenizer, a ball mill, a paint shaker, or an ultrasonic dispersing machine, and the stirring and mixing may be performed by using a stirring machine using a typical stirring blade, a magnetic stirrer, or a high-speed dispersing machine.

The physical properties of the recording ink of the present invention is not particularly limited and may be appropriately selected depending on the purpose, for example, the viscosity, surface tension, and the like thereof are preferably within the following ranges.

The viscosity of the recording ink at 25° C. is preferably 5 mPa·s to 20 mPa·s. When the viscosity is 5 mPa·s or more, the ink can provide higher image density and better image quality. While excellent discharge ability is maintained by adjusting the ink viscosity at 20 mPa·s or less.

The viscosity of the recording ink can be measured at 25° C. using a viscometer (RL-500, manufactured by Toki Sangyo Co.).

The static surface tension of the recording ink at 25° C. is preferably 20 mN/m to 35 mN/m, and more preferably 20 mN/m to 30 mN/m. When the static surface tension is 20 mN/m to 35 mN/m, the increased permeability highly effects on the decrease of bleeding, thereby excellent in drying property when printing on regular paper. The recording ink is easily wettable to a pretreated layer, thereby obtaining excellent color development and forming less white spots. When the static surface tension is more than 35 mN/m, the ink leveling is hard to occur on the recording medium, thereby causing the extension of drying time.

The color of the recording ink of the present invention is not particularly limited and may be appropriately selected depending on the purpose. Examples of the colors include yellow, magenta, cyan, and black. When recording is performed by using an ink set employing the combination of two or more colors, a multicolor image can be formed, and when recording is performed by using an ink set employing a full-color combination, a full-color image can be formed.

The recording ink of the present invention can be advantageously used in printers using the following inkjet heads: a so-called piezo-type inkjet head in which a piezoelectric element is used as a pressure generating unit that pressurizes ink located in an ink channel to deform an oscillation plate forming a wall surface of the ink channel, and the internal volume of the ink channel is changed thereby discharging an ink droplet (see JP-A No. 02-51734), a so-called thermal-type inkjet head that uses a heat-generating resistor to heat the ink in an ink channel and generate gas bubbles (see JP-A No. 61-59911), and an electrostatic inkjet head in which an oscillation plate forming a wall surface of an ink channel is disposed opposite to an electrode, and the oscillation plate is deformed by electrostatic forces generated between the oscillation plate and the electrode so as to change the internal volume of the ink channel, thereby discharging an ink droplet (see JP-A No. 06-71882).

The recording ink of the present invention can be utilized for variety of articles such as fountain pens, ball pens, magic pens, and sign pens, in particular applied as inkjet recording ink to image forming apparatuses such as printers in inkjet recording, more specifically, printers having a function to facilitate printing fixation by heating the recording medium or the recording ink at 50° C. to 200° C. during, before or after the printing. In addition, the recording ink of the present invention can suitably used for an ink media set, ink cartridge, inkjet recording method, inkjet recording apparatus, and inkjet record according to the present invention.

<Recording Medium>

A recording medium is regular paper having no coat layer, and preferably regular paper having sizing degree of 10 S or more, and air permeability of 5 S to 50 S, which is generally used as copy paper.

The method for applying the pretreatment liquid of the present invention to a recording medium and recording an image using a recording liquid containing a colorant will be explained with reference to FIG. 1 which shows an example of an apparatus for performing an image recording method of the present invention. An example of an apparatus shown in FIG. 1 is a recording apparatus for forming an image by scanning an inkjet recording head.

In the inkjet recording apparatus having a function of performing a pretreatment shown in FIG. 1, a recording medium 6 is fed by a paper feed roller 7, and a pretreatment liquid 1 is uniformly and thinly applied on the recording medium 6 by an applicator roller 4 and a counter roller 5. The pretreatment liquid 1 is drawn by a drawing roller 3 and then uniformly applied to the applicator roller 4 while the thickness is controlled by a thickness controlling roller 2. The recording medium 6 is fed to a recording scanning section having an inkjet recording head 20 while being applied with the pretreatment liquid 1. The distance between a pretreatment end point (i.e., a point A in FIG. 1) and a starting point of record scanning (i.e., a point B in FIG. 1) is longer than the length of the recording medium 6 in the feeding direction. Therefore when the tip edge of the recording medium 6 reaches the starting point of record scanning B, the pretreatment operation has been completed. In this case, the pretreatment operation has been completed before the recording medium 6 is intermittently fed such that images are recorded thereon by scanning the inkjet recording head 20. Namely, the pretreatment liquid 1 can be applied continuously on the recording medium 6 at a constant speed. Therefore, the pretreatment liquid 1 can be uniformly applied on the recording medium 6. In the recording apparatus shown in FIG. 1, the recording medium 6 on which the pretreatment liquid 1 is to be applied is set in the lower cassette. A recording medium 17 on which the pretreatment liquid 1 need not or should not to be applied is set in the upper cassette. Therefore, it is advantageous to provide the distance between the cassette and the recording portion long enough to apply the pretreatment liquid 1.

Figure 2:
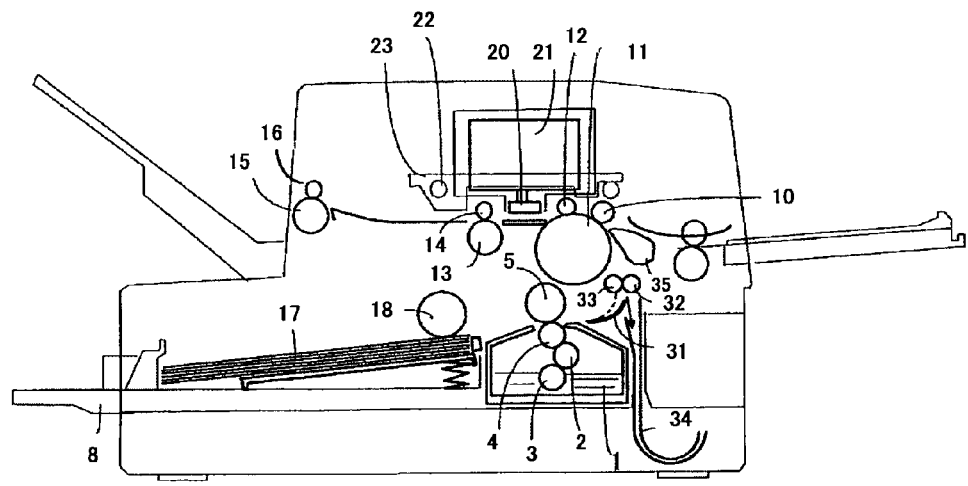
FIG. 2 is an example of a cross-sectional side view of an apparatus which is another embodiment of the present invention.

FIG. 2 is a schematic view illustrating another embodiment of the image recording apparatus for performing the image forming method of the present invention. An example of the apparatus shown in FIG. 2 is also a recording apparatus in which an image is recorded by scanning an inkjet recording head. This recording apparatus is more compact than the recording apparatus shown in FIG. 1. A recording medium 17 is fed by a paper feed roller 18, and a pretreatment liquid 1 is uniformly and thinly applied on the recording medium 17 by an applicator roller 4 and a counter roller 5. The pretreatment liquid 1 is drawn by a drawing roller 3 and is uniformly applied to the applicator roller 4 by a thickness controlling roller 2. The recording medium 17 is fed while being applied with the pretreatment liquid 1 and passes through a recording scanning portion having an inkjet recording head 20. The recording medium 17 is fed until the recording medium 17 is completely subjected to the pretreatment. When the pretreatment is completed, the recording medium 17 is returned such that the leading edge of the recording medium 17 is located at the starting position of record scanning. The completion of the pretreatment operation can be determined, for example, by detecting the recording medium 17 using a known detector (not shown) provided at the exit of the pretreatment liquid application device. This detector is not necessary to be provided. Alternatively, information about the length of the recording medium 17 is preliminarily input to a controller and the rotation number of the motor which drives the feeding rollers is controlled such that the feed par revolution of the circumference of the feeding roller for the recording medium 17 corresponds to the length of the recording medium 17.

The recording medium 17 on which the pretreatment liquid 1 has been applied, is again fed to the recording scanning position before the pretreatment liquid is dried and solidified, wherein the recording medium 17 is intermittently fed in synchronization with scanning by means of an inkjet recording head 20. If the recording medium 17 is returned through the same passage through which the recording medium 17 has been fed, the rear edge of the recording medium 17 goes into the pretreatment liquid application device and thereby problems such that the recording medium 17 is contaminated by the pretreatment liquid, unevenly applied with the pretreatment liquid 1 or jammed at the device occur. Therefore, when the recording medium 17, on which the pretreatment liquid 1 has been applied, is returned, the passage of the recording medium 17 is changed by a guide 31. Namely, the position of the guide 31 is changed to the position illustrated by a dotted line using a known means such as a solenoid or a motor, such that the recording medium 17 is returned through a guide for return 34. Thus the problems mentioned above can be avoided.

In FIGS. 1 and 2, 8 denotes a paper feed tray, 10 denotes a paper feed roller, 11, 12, 13, 14 and 16 denote recording medium feed rollers, 18 denotes a paper feed roller, 21 denotes an ink cartridge, 22 denotes a carriage axis, 23 denotes a carriage, 32 and 33 denote recording medium feed rollers, and 35 denotes a paper feed guide.

The pretreatment liquid application step is preferably performed continuously at a constant linear velocity of 10 mm/s to 1,000 mm/s. In the recording apparatus shown in FIG. 2, after the pretreatment liquid application step is performed on a sheet of the recording medium 17, the image recording step is started for the sheet by means of an inkjet recording method. In this case, since the speed of the pretreatment liquid application step is generally different from that of the image recording step, the time between the tip edge of the sheet is applied with the pretreatment liquid and an image is recorded on the tip edge is different from the time for the rear edge of the sheet. Even in a case such that this time difference is fairly large, since the pretreatment liquid of the present invention includes a large amount of a hydrophilic solvent having a higher boiling point than water and a low evaporating speed and in addition the water content of the pretreatment liquid is controlled so as to be almost equal to the equilibrium water content of the air in the environment where the printer is used, the evaporation of water in the pretreatment liquid can be fairly prevented. Therefore, the difference in image qualities between the tip edge of a recording sheet and the rear edge thereof is so little as not to be visually detected.

As can be understood from the above description, the recording medium on which the pretreatment liquid has been applied is often necessary to be fed by means of contact-feeding elements such as a roller, a guide, etc. for image formation. In this case, when the pretreatment liquid applied on the recording medium is transferred onto the feeding members, a feeding failure occurs or a problem occurs in that the image quality is lowered due to contamination of the feeding members. In order to avoid such problems, from the standpoint of the apparatus, it is preferable to use a waved guide plate and a guide roller with a spur. In addition, it is also preferable that the surface of a roller is formed of a water repellant material.

However, it is important that the pretreatment liquid applied on the recording medium is rapidly absorbed therein such that the surface of the recording medium is dried in appearance. In order that the recording medium applied with a pretreatment liquid achieves such a state, the pretreatment liquid preferably has a surface tension of 40 mN/m or less so as to immediately penetrate into the recording medium. The passage "the pretreatment liquid is dried and solidified" after the pretreatment liquid has been applied on the recording medium means that the pretreatment liquid applied is solidified after the liquid components therein have evaporated and cannot be maintained in the liquid state, but does not mean that the pretreatment liquid applied on a recording medium appears to be dried in appearance because of being absorbed in the recording medium. By using such recording apparatus as mentioned above which include a combination of a pretreatment liquid application device and an image recording device, the inkjet recording can be performed on a recording medium in which the pretreatment liquid is penetrated and the surface of the recording medium is dried in appearance, but the pretreatment liquid is not solidified. Therefore, even when the pretreatment liquid is applied in a relatively small amount, the image quality can be outstandingly improved.

In order to control the operation of the image recording apparatuses as shown in FIGS. 1 and 2, when a print order is received by a host machine such as a personal computer, the image recording apparatus (including the pretreatment applicator) starts to perform preliminary operations (i.e., a pretreatment liquid application step and a head cleaning step at the same time). After completion of the preliminary operations, the image recording apparatus starts to perform an image recording operation. At the data transmitting operation, the image data transmitted per one time may be the data corresponding to one scanning line images, plural scanning line images, or one page images. The head cleaning operation and ink-discharging check operation are not necessarily performed. In addition, it is not necessary to sequentially perform the head cleaning and ink-discharging check operations, and the image data processing and image data transmission operations. Namely, it is possible to perform in parallel the pretreatment, head cleaning, ink-discharging check, image data processing and image data transmission operations. By performing these operations in parallel, images can be recorded without substantially deteriorating throughput of the image recording apparatus even when the pretreatment liquid application step is performed.

As the inkjet device for use in the image recording method of the present invention, any known inkjet devices can be used to deposit the recording liquid dropwise onto a recording medium on which the pretreatment liquid has been applied so as to form an image. With reference to the image recording apparatuses as shown in FIGS. 1 and 2, an example of an inkjet recording method using scanning head system is illustrated. By using lined heads, the pretreatment liquid application step and the image recording step can be performed on a recording medium simultaneously at a constant feeding speed.

As the method for depositing the recording liquid dropwise onto the recording medium on which the pretreatment liquid has been applied, an inkjet recording method is preferably used. Examples of inkjet recording methods include methods using an on-demand head using a piezoelectric actuator such as PZT; methods in which thermal energy is applied to an on-demand head; methods using an on-demand head using an actuator utilizing electrostatic force; and methods using a charge controlling type continuous injection head. When using the methods in which thermal energy is applied to a head, it is hard to freely control discharging of ink drops and the image quality varies depending on types of recording media. However, by applying the pretreatment liquid of the present invention on the media, such a problem can be avoided, and stable image quality can be obtained on various recording media.

The image forming method using the ink is applicable to various types of recording by inkjet recording, and in particular advantageously applicable, for example, to printers, facsimile devices, copiers, and printer/fax/copier multipurpose machines for inkjet recording.

EXAMPLES

Hereinafter, Examples of the present invention will be described, which however shall not be construed as limiting the scope of the present invention. All part(s) are by mass unless indicated otherwise.

Preparation Example 1

Preparation of Magenta Pigment-Containing Fine Polymer Particle Dispersion Liquid <Preparation of Polymer Solution A>

An inside of a 1 L flask equipped with a mechanical stirrer, a thermometer, a nitrogen gas introducing tube, a reflux tube and a dropping funnel was sufficiently replaced with nitrogen gas, then 11.2 g of styrene, 2.8 g of acrylic acid, 12.0 g of lauryl methacrylate, 4.0 g of polyethylene glycol methacrylate, 4.0 g of styrene macromer and 0.4 g of mercaptoethanol were mixed therein, and the temperature thereof raised to 65° C.

Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethyl valeronitrile and 18 g of methyl ethyl ketone was dropped for 2.5 hours in the flask. After dropping, a mixed solution of 0.8 g of azobismethyl valeronitrile and 18 g of methyl ethyl ketone was dropped for 0.5 hours in the flask. After maturing at 65° C. for one hour, 0.8 g of azobismethyl valeronitrile was added, and the mixture was further matured for one hour. After the termination of the reaction, 364 g of methyl ethyl ketone was added in the flask to prepare 800 g of Polymer Solution A having a concentration of 50% by mass.

<Preparation of Pigment-Containing Fine Polymer Particle Dispersion Liquid>

Twenty eight (28) g of Polymer Solution A, 42 g of C. I. Pigment Red 122, 13.6 g of 1 mol/L aqueous potassium hydroxide solution, 20 g of methyl ethyl ketone, and 13.6 g of ion-exchanged water were thoroughly stirred, and kneaded using a roll mill. The obtained paste was charged in 200 g of pure water, and sufficiently stirred. Thereafter, the mixture was treated with an evaporator so as to evaporate methyl ethyl ketone and water, and then the dispersion liquid was filtrated under pressure through a polyvinylidene fluoride membrane filter having an average pore diameter of 5.0 μm so as to remove coarse particles, thereby obtaining magenta pigment-containing fine polymer particle dispersion liquid which contained 15% by mass of the pigment and had a solid content of 20% by mass. The average particle diameter ($D_{50}$) was measured by a particle size distribution measurement device (NANOTRACK UPA-EX150, manufactured by Nikkiso Co. Ltd.). The fine polymer particles had an average particle diameter ($D_{50}$) of 82.7 nm in the obtained magenta pigment-containing fine polymer particle dispersion liquid.

Preparation Example 2

Preparation of Cyan Pigment-Containing Fine Polymer Particle Dispersion Liquid

A cyan pigment-containing fine polymer particle dispersion liquid was prepared in the same manner as in Preparation Example 1, except that as a pigment C. I. Pigment Red 122 in Preparation Example 1 was replaced with phthalocyanine pigment (C. I. Pigment Blue 15:3).

The average particle diameter ($D_{50}$) was measured by a particle size distribution measurement device (NANOTRACK UPA-EX150, manufactured by Nikkiso Co. Ltd.). The fine polymer particles had an average particle diameter ($D_{50}$) of 110.6 nm in the obtained cyan pigment-containing fine polymer particle dispersion liquid.

Preparation Example 3

Preparation of Yellow Pigment-Containing Fine Polymer Particle Dispersion Liquid A yellow pigment-containing fine polymer particle dispersion liquid was prepared in the same manner as in Preparation Example 1, except that as a pigment C. I. Pigment Red 122 in Preparation Example 1 was replaced with monoazo yellow pigment (C. I. Pigment Yellow 74).

The average particle diameter ($D_{50}$) was measured by a particle size distribution measurement device (NANOTRACK UPA-EX150, manufactured by Nikkiso Co. Ltd.). The fine polymer particles had an average particle diameter ($D_{50}$) of 105.4 nm in the obtained yellow pigment-containing fine polymer particle dispersion liquid.

Preparation Example 4

Preparation of Carbon Black Pigment-Containing Fine Polymer Particle Dispersion Liquid A carbon black pigment-containing fine polymer particle dispersion liquid was prepared in the same manner as in Preparation Example 1, except that as a pigment C. I. Pigment Red 122 in Preparation Example 1 was replaced with carbon black (FW100, manufactured by Degussa).

The average particle diameter ($D_{50}$) was measured by a particle size distribution measurement device (NANOTRACK UPA-EX150, manufactured by Nikkiso Co. Ltd.). The fine polymer particles had an average particle diameter ($D_{50}$) of 75.2 nm in the obtained carbon black pigment-containing fine polymer particle dispersion liquid.

Preparation Examples 5 to 20

Preparation of Recording Ink

Each of the recording inks was prepared as follows:

At first, a water-soluble organic solvent (wetting agent), penetrating agent, surfactant, antifungal agent and water, which are shown in Tables 1 and 2 were mixed and stirred for 1 hour so as to be uniformly mixed. In some cases, in a mixed liquid, a water-dispersible resin was added and stirred for 1 hour, and then a pigment dispersion liquid, antifoaming agent and pH adjusting agent were further added and stirred for 1 hour. This dispersion liquid was subjected to pressure filtration by using a polyvinylidene fluoride membrane filter having an average pore size of 5.0 μm, so as to remove coarse particles and contaminant, thereby preparing each of recording inks of Preparation Examples 5 to 20.

TABLE 1

| | Component (mass %) | Preparation Examples | | | | | | | |
|---|---|---|---|---|---|---|---|---|---|
| | | 5 | 6 | 7 | 8 | 9 | 10 | 11 | 12 |
| Pigment dispersion liquid | Magenta pigment-containing fine polymer particle dispersion liquid (Preparation Example 1) | 53.3 | — | — | — | — | — | — | — |
| | Cyan pigment-containing fine polymer particle dispersion liquid (Preparation Example 2) | — | 33.3 | — | — | — | — | — | — |
| | Yellow pigment-containing fine polymer particle dispersion liquid (Preparation Example 3) | — | — | 33.3 | — | — | — | — | — |
| | Black pigment-containing fine polymer particle dispersion liquid (Preparation Example 4) | — | — | — | 53.3 | — | — | — | — |
| | Self-dispersible magenta pigment-containing liquid (CAB-O-JET 260) | — | — | — | — | 59.1 | — | — | — |
| | Self-dispersible cyan pigment-containing liquid (CAB-O-JET 250) | — | — | — | — | — | 45.5 | — | — |
| | Self-dispersible yellow pigment-containing liquid (CAB-O-JET 270) | — | — | — | — | — | — | 45.5 | — |
| | Self-dispersible black pigment-containing liquid (CAB-O-JET 300) | — | — | — | — | — | — | — | 53.3 |
| Water-dispersible resin | Fluorine resin emulsion | — | — | — | — | 5.8 | 7.7 | 7.7 | 5.8 |
| | Acrylic silicone resin emulsion | — | — | — | — | — | — | — | — |
| Wetting agent | 1,3-butanediol | 21.8 | 26.0 | 26.0 | — | 30.0 | 17.0 | 27.0 | — |
| | 3-methyl-1,3-butanediol | — | — | — | 16.0 | — | — | — | 16.0 |
| | 2-pyrrolidone | — | — | — | — | — | — | — | 2.0 |
| | Glycerin | 14.5 | 13.0 | 13.0 | 16.0 | 10.0 | 17.0 | 9.0 | 16.0 |
| Penetrating agent | 2-ethyl-1,3-hexanediol | 1.0 | 1.0 | 1.0 | 1.0 | 2.0 | 2.0 | 2.0 | 2.0 |
| | 2,2,4-trimethyl-1,3-pentanediol | 1.0 | 1.0 | 1.0 | 1.0 | — | — | — | — |
| Surfactant | ZONYL FS-300 | 2.5 | 2.5 | 2.5 | 2.5 | — | — | — | — |
| | KF-643 | — | — | — | — | 1.0 | 1.0 | 1.0 | 1.0 |
| | SOFTANOL EP-7025 | — | — | — | — | — | — | — | — |
| Antifungal Agent | PROXEL GXL | 0.05 | 0.05 | 0.05 | 0.05 | 0.05 | 0.05 | 0.05 | 0.05 |
| Antifoaming agent | Silicone antifoaming agent KM-72F | 0.1 | 0.1 | 0.1 | 0.1 | 0.1 | 0.1 | 0.1 | 0.1 |
| pH adjusting agent | 2-amino-2-ethyl-1,3-propanediol | 0.2 | 0.4 | 0.3 | 0.2 | 0.3 | 0.3 | 0.3 | 0.6 |
| | Pure Water | balance | balance | balance | balance | balance | balance | balance | balance |
| | Total (% by mass) | 100 | 100 | 100 | 100 | 100 | 100 | 100 | 100 |

TABLE 2

| | Component (mass %) | Preparation Examples | | | | | | | |
|---|---|---|---|---|---|---|---|---|---|
| | | 13 | 14 | 15 | 16 | 17 | 18 | 19 | 20 |
| Pigment dispersion liquid | Magenta pigment-containing fine polymer particle dispersion liquid (Preparation Example 1) | 53.3 | — | — | — | — | — | — | — |
| | Cyan pigment-containing fine polymer particle dispersion liquid (Preparation Example 2) | — | 33.3 | — | — | — | — | — | — |
| | Yellow pigment-containing fine polymer particle dispersion liquid (Preparation Example 3) | — | — | 33.3 | — | — | — | — | — |
| | Black pigment-containing fine polymer particle dispersion liquid (Preparation Example 4) | — | — | — | 53.3 | — | — | — | — |
| | Self-dispersible magenta pigment-containing liquid (CAB-O-JET 260) | — | — | — | — | 63.6 | — | — | — |
| | Self-dispersible cyan pigment-containing liquid (CAB-O-JET 250) | — | — | — | — | — | 45.5 | — | — |
| | Self-dispersible yellow pigment-containing liquid (CAB-O-JET 270) | — | — | — | — | — | — | 45.5 | — |
| | Self-dispersible black pigment-containing liquid (CAB-O-JET 300) | — | — | — | — | — | — | — | 53.3 |
| Water-dispersible resin | Fluorine resin emulsion | — | — | — | — | — | — | — | — |
| | Acrylic silicone resin emulsion | 8.0 | 10.0 | 10.0 | 12.5 | — | — | — | — |
| Wetting agent | 1,3-butanediol | 23.0 | 24.0 | 24.0 | — | 20.0 | 30.0 | 30.0 | — |
| | 3-methyl-1,3-butanediol | — | — | — | 17.0 | 2.0 | — | — | 21.0 |
| | 2-pyrrolidone | — | — | — | 2.0 | — | — | — | — |
| | Glycerin | 7.5 | 8.0 | 8.0 | 8.5 | 10.0 | 10.0 | 10.0 | 10.5 |
| Penetrating agent | 2-ethyl-1,3-hexanediol | 2.0 | 2.0 | 2.0 | 2.0 | — | — | — | — |
| | 2,2,4-trimethyl-1,3-pentanediol | — | — | — | — | 1.0 | 1.0 | 1.0 | 1.0 |
| Surfactant | ZONYL FS-300 | 2.5 | 2.5 | 2.5 | 2.5 | — | — | — | — |
| | KF-643 | — | — | — | — | — | — | — | — |
| | SOFTANOL EP-7025 | — | — | — | — | 1.0 | 1.0 | 1.0 | 1.0 |
| Antifungal Agent | PROXEL GXL | 0.05 | 0.05 | 0.05 | 0.05 | 0.05 | 0.05 | 0.05 | 0.05 |
| Antifoaming agent | Silicone antifoaming agent KM-72F | 0.1 | 0.1 | 0.1 | 0.1 | — | — | — | — |

TABLE 2-continued

|  | Component (mass %) | Preparation Examples | | | | | | | |
|---|---|---|---|---|---|---|---|---|---|
|  |  | 13 | 14 | 15 | 16 | 17 | 18 | 19 | 20 |
| pH adjusting agent | 2-amino-2-ethyl-1,3-propanediol | 0.3 | 0.5 | 0.2 | 0.2 | 0.5 | 0.2 | 0.5 | 0.5 |
|  | Pure Water | balance | balance | balance | balance | balance | balance | balance | balance |
|  | Total (% by mass) | 100 | 100 | 100 | 100 | 100 | 100 | 100 | 100 |

The abbreviations in Tables 1 and 2 mean as follows:
CAB-O-JET 260: a self-dispersible magenta pigment, a solid content of 11%, manufactured by CABOT
CAB-O-JET 250: a self-dispersible cyan pigment, a solid content of 11%, manufactured by CABOT
CAB-O-JET 270: a self-dispersible yellow pigment, a solid content of 11%, manufactured by CABOT
CAB-O-JET 300: a self-dispersible black pigment, a solid content of 15%, manufactured by CABOT
Fluorine resin emulsion: LUMIFLON FE4500, a solid content of 52% by mass, an average particle diameter of 136 nm, a minimum film-forming temperature (MFT) = 28° C., manufactured by Asahi Glass Co., Ltd.
Acrylic silicone resin emulsion: POLYSOL ROY6312, a solid content of 40% by mass, an average particle diameter of 171 nm, a minimum film-forming temperature (MFT) = 20° C., manufactured by SHOWA HIGHPOLYMER CO., LTD.
ZONYL FS-300: polyoxyethylene perfluoroalkyl ether, a component of 40% by mass, manufactured by Dupont
KF-643: polyether-modified silicone surfactant, a component of 100% by mass, manufactured by Shin-Etsu Chemical Co., Ltd.
SOFTANOL EP-7025: Polyoxyalkylene alkyl ether, a component of 100% by mass, manufactured by NIPPON SHOKUBAI CO., LTD.
PROXEL GXL: an antifungal agent mainly containing 1,2-benzisothiazolin-3-one, a component of 20% by mass, containing dipropylene glycol, manufactured by Avecia Co.
KM-72F: a self-emulsifiable silicone antifoaming agent, a component of 100% by mass, manufactured by Shin-Etsu Silicones Co. Ltd.

Next, each of the recording inks of Preparation Examples 5 to 20 was evaluated on the following evaluation method. The results are shown in Table 3.

<Average Particle Diameter of Ink>

The average particle diameter ($D_{50}$) of the ink was measured by a particle size distribution measurement device (NANOTRACK UPA-EX150, manufactured by Nikkiso Co. Ltd.).

<Measurement of Ink Viscosity>

The viscosity of the ink was measured at 25° C. by a viscometer (RE-550L, manufactured by Toki Sangyo Co., Ltd.).

<Measurement of Static Surface Tension of Ink>

The surface tension of the ink was measured by an automatic surface tensiometer (CBVP-Z manufactured by Kyowa Interface Science Co., Ltd.) at a temperature of 25° C.

TABLE 3

|  | Ink properties | | |
|---|---|---|---|
|  | Particle diameter D50 (nm) | Viscosity (mPa · s) | Static surface tension (mN/m) |
| Preparation Example 5 | 86.6 | 7.93 | 24.5 |
| Preparation Example 6 | 125.2 | 8.15 | 24.6 |
| Preparation Example 7 | 108.0 | 8.13 | 25.3 |
| Preparation Example 8 | 84.6 | 8.12 | 24.5 |
| Preparation Example 9 | 106.5 | 8.08 | 25.0 |
| Preparation Example 10 | 92.4 | 8.00 | 24.7 |
| Preparation Example 11 | 137.5 | 8.09 | 24.6 |
| Preparation Example 12 | 132.0 | 8.14 | 24.6 |
| Preparation Example 13 | 90.7 | 8.01 | 24.9 |
| Preparation Example 14 | 126.1 | 8.18 | 25.1 |
| Preparation Example 15 | 112.4 | 8.09 | 25.0 |
| Preparation Example 16 | 88.7 | 8.22 | 25.2 |
| Preparation Example 17 | 106.4 | 6.55 | 32.3 |
| Preparation Example 18 | 91.8 | 6.42 | 32.4 |
| Preparation Example 19 | 139.2 | 6.71 | 32.5 |
| Preparation Example 20 | 133.1 | 6.46 | 31.9 |

Preparation Examples 21 to 27

Preparation of Pretreatment Liquid

Each of the pretreatment liquids was prepared as follows: At first, materials such as cationic polymer compounds and the like shown in Table 4 were mixed and stirred for 1 hour so as to be uniformly mixed. The pretreatment liquid was subjected to pressure filtration by using a polyvinylidene fluoride membrane filter having an average pore size of 5.0 μm, so as to remove coarse particles and contaminant, thereby preparing each of recording inks of Preparation Examples 21 to 27.

TABLE 4

|  | | Preparation Examples | | | | | | |
|---|---|---|---|---|---|---|---|---|
| Component (% by mass) | | 21 | 22 | 23 | 24 | 25 | 26 | 27 |
| Cationic polymer compound | SHALLOL DC-902P | 20.0 | — | — | — | — | — | 20.0 |
|  | SHALLOL DC-303P | — | 25.0 | — | — | — | — | — |
|  | POLYMARON 360 | — | — | 50.0 | — | — | 25.0 | — |
| Polymer compound | AQUALIC HL-415 | — | — | — | 22.0 | 22.0 | — | — |

TABLE 4-continued

|  | Component (% by mass) | Preparation Examples | | | | | | |
| --- | --- | --- | --- | --- | --- | --- | --- | --- |
|  |  | 21 | 22 | 23 | 24 | 25 | 26 | 27 |
| Organic acid | Citric acid | 0.5 | — | — | 1.0 | — | — | 0.5 |
|  | Ascorbic acid | — | 1 | — | — | — | — | — |
|  | Aspartic acid | — | — | 0.2 | — | — | — | — |
| Wetting agent | 1,3-butanediol | — | — | 5.00 | — | — | 5.00 | — |
|  | Glycerin | — | 15.00 | 10.00 | — | 10.00 | 10.00 | — |
| Penetrating agent | 2-ethyl-1,3-hexanediol | — | 1.00 | 1.00 | — | — | 1.00 | — |
| Surfactant | ZONYL FS-300 | 0.10 | — | 0.20 | — | — | — | — |
|  | KF-643 | — | 0.20 | — | — | — | — | — |
|  | SOFTANOL EP-7025 | — | — | — | 0.200 | — | — | 0.10 |
| Antifungal Agent | PROXEL GXL | 0.050 | 0.050 | 0.050 | 0.050 | 0.050 | 0.050 | 0.050 |
|  | Pure Water | balance | balance | balance | balance | balance | balance | balance |
|  | Total (% by mass) | 100 | 100 | 100 | 100 | 100 | 100 | 100 |

The abbreviations in Table 4 means as follows:
SHALLOL DC-902P: a cationic polymer compound of dialkyl diallyl-quaternary ammonium salt, a solid content of 50% by mass, pH 3 to 5, manufactured by Dai-ichi Kogyo Seiyaku Co., Ltd.
SHALLOL DC-303P: a cationic polymer compound of dialkyl diallyl-quaternary ammonium salt, a solid content of 41% by mass, pH 3 to 5, manufactured by Dai-ichi Kogyo Seiyaku Co., Ltd.
POLYMARON 360: a cationic polymer compound, a solid content of 20% by mass, pH 4.5 to 5.5, a styrene maleic acid copolymer, manufactured by Arakawa Chemical Industries, Ltd.
AQUALIC HL-415: a polyacrylic acid polymer compound, a solid content of 45% by mass, pH 2 or less, manufactured by NIPPON SHOKUBAI CO., LTD.
ZONYL FS-300: polyoxyethylene perfluoroalkyl ether, a component of 40% by mass, manufactured by Dupont
KF-643: polyether-modified silicone surfactant, a component of 100% by mass, manufactured by Shin-Etsu Chemical Co., Ltd.
SOFTANOL EP-7025: Polyoxyalkylene alkyl ether, an active component of 100% by mass, manufactured by NIPPON SHOKUBAI CO., LTD.
PROXEL GXL: an antifungal agent mainly containing 1,2-benzisothiazolin-3-one, a component of 20% by mass, containing dipropylene glycol, manufactured by Avecia Co.

The measurement results of static surface tensions of the pretreatment liquids of Preparation Examples 21 to 27 were as follows:

Preparation Example 21: 22.1 mN/m
Preparation Example 22: 22.7 mN/m
Preparation Example 23: 24.5 mN/m
Preparation Example 24: 30.7 mN/m
Preparation Example 25: 46.4 mN/m
Preparation Example 26: 38.7 mN/m
Preparation Example 27: 30.9 mN/m Examples and Comparative Examples On a recording medium, each of the pretreatment liquids of Preparation Examples 21 to 27 was applied by a wire bar coating method and dried with warm air, or was applied by the apparatus shown in FIG. 1 or FIG. 2 and natural dried, so as to subject the recording medium to pretreatment. After the pretreatment, in an atmosphere at a temperature of 23±0.5° C. and a relative humidity of 50±5%, a drive voltage of piezo element was varied so as to uniformly discharge an, ink using an inkjet printer (IPSIO GX3000, manufactured by Ricoh Company, Ltd.), thereby depositing the same amount of ink on each of recording media.

TABLE 5

|  |  | Pretreatment | | | | Inkjet recording | |
| --- | --- | --- | --- | --- | --- | --- | --- |
|  | Recording medium | Pretreatment liquid | Coated amount (dry basis) | Coating method | Drying method | Inkset | GX3000 print mode |
| Example 1 | MY PAPER | Preparation Example 21 | 0.5 g/m² | Bar coat | Warm-air drying | Preparation Examples 5-8 | Regular paper, standard fast |
| Example 2 | Type 6200 | Preparation Example 21 | 0.5 g/m² | Bar coat | Warm-air drying | Preparation Examples 9-12 | Regular paper, standard fast |
| Example 3 | 4024 | Preparation Example 22 | 1.8 g/m² | Roll coat | Natural drying | Preparation Examples 13-16 | Regular paper, standard fast |
| Example 4 | Type 6200 | Preparation Example 23 | 1.8 g/m² | Roll coat | Natural drying | Preparation Examples 5-8 | Regular paper, standard fast |
| Example 5 | MY RECYCLE PAPER 100W | Preparation Example 21 | 1.0 g/m² | Bar coat | Warm-air drying | Preparation Examples 13-16 | Regular paper, standard fast |
| Example 6 | MY PAPER | Preparation Example 22 | 2.5 g/m² | Bar coat | Warm-air drying | Preparation Examples 17-20 | Regular paper, standard fast |
| Comparative Example 1 | MY PAPER | — | — | — | — | Preparation Example 5-8 | Regular paper, standard fast |
| Comparative Example 2 | MY RECYCLE PAPER 100W | Preparation Example 24 | 1.0 g/m² | Bar coat | Warm-air drying | Preparation Examples 13-16 | Regular paper, standard fast |
| Comparative Example 3 | 4024 | Preparation Example 24 | 1.8 g/m² | Roll coat | Natural drying | Preparation Examples 13-16 | Regular paper, standard fast |
| Comparative Example 4 | Type 6200 | Preparation Example 25 | 1.8 g/m² | Roll coat | Natural drying | Preparation Examples 5-8 | Regular paper, standard fast |
| Comparative Example 5 | POD GLOSS COAT | Preparation Example 23 | 1.0 g/m² | Bar coat | Warm-air drying | Preparation Examples 9-12 | Regular paper, standard fast |

TABLE 5-continued

|  | Recording medium | Pretreatment | | | | Inkjet recording | |
|---|---|---|---|---|---|---|---|
|  |  | Pretreatment liquid | Coated amount (dry basis) | Coating method | Drying method | Inkset | GX3000 print mode |
| Comparative Example 6 | Type 6200 | Preparation Example 26 | 0.5 g/m$^1$ | Bar coat | Warm-air drying | Preparation Examples 17-20 | Regular paper, standard fast |
| Comparative Example 7 | MY PAPER | Preparation Example 27 | 0.5 g/m$^2$ | Bar coat | Warm-air drying | Preparation Examples 5-8 | Regular paper, standard fast |

The details of recording media listed in Table 5 are shown as follows:
MY PAPER: high quality paper, a basis weight of 69.6 g/m$^2$, a sizing degree of 23.2 sec., an air permeability of 21 sec., manufactured by Ricoh Company, Ltd.
TYPE6200: high quality paper, a basis weight of 71.7 g/m$^2$, a sizing degree of 20 sec., an air permeability of 22.5 sec., manufactured by Ricoh Company, Ltd.
4024: high quality paper, a basis weight of 81.5 g/m$^2$, a sizing degree of 27 sec., an air permeability of 16 sec., manufactured by XEROX CORPORATION
MY RECYCLE PAPER 100W: recycled paper, a basis weight of 68.5 g/m$^2$, a sizing degree of 29 sec., an air permeability of 16 sec., manufactured by Ricoh Company, Ltd.
POD GLOSS COAT: coated paper, a basis weight of 100 g/m$^2$, a sizing degree of 12 sec., an air permeability of 2,990 sec., manufactured by Oji paper Co., Ltd.

<Image Density>

A chart, formed using Microsoft Word 2000 (by Microsoft Corporation), with a 64 point symbol "■" was printed on each recording medium, and the color of the symbol "■" part on the print surface was measured using X-Rite 938 and evaluated on the following evaluation criteria. The print mode was set to "regular paper & standard fast" using a driver attached to the printer.
[Evaluation Criteria]
  A: black≥1.4, yellow≥0.9, magenta≥1.1, cyan≥1.2
  B: 1.4>black≥1.3, 0.9>yellow≥0.85, 1.1>magenta≥1.0, 1.2>cyan≥1.1
  C: 1.3>black≥1.2, 0.85>yellow≥0.8, 1.0>magenta≥0.9, 1.1>cyan≥1.0
  D: 1.2>black, 0.8>yellow, 0.9>magenta, 1.0>cyan
<Color Saturation>

A chart, formed using Microsoft Word 2000 (by Microsoft Corporation), similar with that of the image density described above was printed on each recording medium, the symbol "■" part on the print surface was measured using X-Rite 938. The print mode was set to "regular paper & standard fast" using a driver attached to the printer.

The ratio of measured color saturation to that of the standard color (Japan color ver.2, yellow: 91.34, magenta: 74.55, cyan: 62.82) was calculated to evaluate the color saturation on the following evaluation criteria.
[Evaluation Criteria]
  A: 0.85 or more
  B: 0.8 or more to less than 0.85
  C: 0.75 or more to less than 0.8
  D: less than 0.75
<Color Bleeding>

On the recording medium, color line images of magenta, cyan and black each having a width of 0.5 mm were formed on a yellow solid image, and then visually observed to determine whether bleeding of color ink occurred at a color boundary portion where different colors of recording liquids were adjacent, i.e. color bleeding. Similarly, the color bleeding was also observed in case of color line images of yellow, magenta and black each having a width of 0.5 mm formed on a cyan solid image, and color line images of yellow, cyan and black each having a width of 0.5 mm formed on a magenta solid image.
[Evaluation Criteria]
  A: No problem occurred.
  B: Color bleeding slightly occurred but no problem occurred.
  C: Color bleeding occurred and problem occurred.

<Feathering>

A chart on which 6 point symbol "䡄" in Kanji, formed using Microsoft Word 2000 (by Microsoft Corporation) was printed on each recording medium, and then visually observed to determine whether feathering occurred.
[Evaluation Criteria]
  A: No problem occurred.
  B: Feathering slightly occurred but no problem occurred.
  C: Some feathering occurred and problem occurred.
  D: Feathering occurred and problem occurred.
<White Spots>

A chart on which 64 point symbol "■" formed using Microsoft Word 2000 (by Microsoft Corporation) was printed on each recording medium, and then the solid images "■" of yellow, magenta, cyan and black on the print surface were visually observed to determine whether white spots generated.
[Evaluation Criteria]
  A: No problem occurred.
  B: White spots were slightly present but no problem occurred.
  C: White spots generated and problem occurred.
<Smear Adhesion>

A chart on which a solid image of 3 cm squares formed using Microsoft Word 2000 (by Microsoft Corporation) was printed on each recording medium, and then dried at a temperature of 23±1° C. and a relative humidity of 50±10% for 24 hours. The solid image "■" on the print surface was rubbed back and forth 10 times with cotton No. 3 (conforming to JIS L0803 standard) attached to a CM-1 clock meter using a double-faced adhesive. The amount of transferred ink from the solid image to that cotton was measured using X-Rite 938. The original color of that cotton was eliminated for obtaining the density. Based on the measured amount, the density of the transferred ink on the cotton was obtained and evaluated using the following criteria.
[Evaluation Criteria]
  A: less than 0.03
  B: 0.03 or more to less than 0.07
  C: 0.07 or more to less than 0.1
  D: 0.1 or more The results are shown in Table 6. The evaluation was performed on each color on the basis of the evaluation criteria. As results of respective image qualities, the most frequently evaluated criterion was selected. When the same numbers of evaluation criteria were obtained, the better one was selected as a result.

TABLE 6

| | Image quality | | | | | |
|---|---|---|---|---|---|---|
| | Image density | Color saturation | Feathering | Color bleeding | White spots | Smear adhesion |
| Example 1 | A | A | A | B | A | A |
| Example 2 | A | B | A | A | B | A |
| Example 3 | A | B | A | A | A | A |
| Example 4 | A | A | B | B | A | A |
| Example 5 | B | B | A | A | B | A |
| Example 6 | B | B | B | A | B | C |
| Comparative Example 1 | B | B | C | C | C | A |
| Comparative Example 2 | B | C | D | C | C | B |
| Comparative Example 3 | B | C | D | C | C | B |
| Comparative Example 4 | B | C | D | C | C | B |
| Comparative Example 5 | A | A | D | C | — | D |
| Comparative Example 6 | B | B | C | B | C | D |
| Comparative Example 7 | B | B | B | B | C | A |

POD GLOSS COAT used in Comparative Example 5 could not be evaluated, because it had a coat layer and originally no white spot generated.

INDUSTRIAL APPLICABILITY

The present invention provides an image forming method, including applying a pretreatment liquid to a surface of regular paper having no coat layer, and forming an image thereon, so as to obtain excellent image quality such as excellent image density and color saturation, and less color bleeding, feathering and white spots, and less smear adhesion in an image part, and to provide an image formed record.

The invention claimed is:

1. An image forming method comprising:
applying a pretreatment liquid to a recording medium; and
discharging an inkjet recording ink dropwise according to an image signal to form an image on the recording medium on which the pretreatment liquid has been applied,
wherein:
the recording medium is regular paper which has no coat layer;
the pretreatment liquid comprises a cationic polymer compound, a surfactant A, water, and a water-soluble organic acid; wherein the water-soluble organic acid comprises at least one member selected from the group consisting of aspartic acid, gluconic acid, pyruvic acid, adipic acid, phytic acid, and salts thereof; wherein the surfactant A comprises at least one member selected from the group consisting of perfluoroalkyl sulfonic acid compounds, perfluoroalkyl carboxyl acid compounds, perfluoroalkyl phosphoric acid ester compounds, perfluoroalkyl ethylene oxide adducts, polyoxyalkylene ether polymer compounds having a perfluoroalkyl ether group in a side-chain, and nonionic silicone surfactants;
the inkjet recording ink comprises a water-dispersible colorant, a water-soluble organic solvent, a surfactant B, a penetrating agent, and water; and
the pretreatment liquid has a static surface tension of 20 mN/m to 30 mN/m.

2. The image forming method according to claim 1, wherein the colorant comprised in the inkjet recording ink is a resin coated pigment or self-dispersible pigment, and the self-dispersible pigment is comprised with a water-dispersible resin in the inkjet recording ink.

3. The image forming method according to claim 1, wherein the cationic polymer compound comprises a cationic polymer compound of quaternary ammonium salt.

4. The image forming method according to claim 1, wherein the pretreatment liquid is applied to the surface of the recording medium so that a coated amount is 0.1 g/m$^2$ to 10 g/m$^2$ on a dry basis.

5. The image forming method according to claim 1, wherein the organic acid has a pKa of 5 or less.

6. The image forming method according to claim 1, wherein the inkjet recording ink has a static surface tension of 20 mN/m to 35 mN/m.

7. The image forming method according to claim 1, wherein the surfactant B is at least one selected from the group consisting of a nonionic fluorine surfactant, an anionic fluorine surfactant, and a silicone surfactant.

8. The image forming method according to claim 1, wherein the water-soluble organic solvent comprises a polyhydric alcohol having an equilibrium moisture content of 40% by mass or more in an atmosphere at a temperature of 23° C. and a relative humidity of 80%.

9. The image forming method according to claim 1, wherein the surfactant A comprises at least one member selected from the group consisting of nonionic silicone surfactants.

10. An image formed record produced by an image forming method comprising:
applying a pretreatment liquid to a recording medium; and
discharging an inkjet recording ink dropwise according to an image signal to form an image on the recording medium on which the pretreatment liquid has been applied,
wherein:
the recording medium is regular paper which has no coat layer;
the pretreatment liquid comprises a cationic polymer compound, a surfactant A, water, a water-soluble organic acid; wherein the water-soluble organic acid comprises at least one member selected from the group consisting of aspartic acid, gluconic acid, pyruvic acid, adipic acid, phytic acid, and salts thereof; wherein the surfactant A comprises at least one member selected from the group consisting of perfluoroalkyl sulfonic acid compounds, perfluoroalkyl carboxyl acid compounds, perfluoroalkyl phosphoric acid ester compounds, perfluoroalkyl ethylene oxide adducts, polyoxyalkylene ether polymer compounds having a perfluoroalkyl ether group in a side-chain, and nonionic silicone surfactants;

the inkjet recording ink comprises a water-dispersible colorant, a water-soluble organic solvent, a surfactant B, a penetrating agent, and water; and the pretreatment liquid has a static surface tension of 20 mN/m to 30 mN/m.

11. The image forming method according to claim 10, wherein the surfactant A comprises at least one member selected from the group consisting of nonionic silicone surfactants.

* * * * *